(12) United States Patent
Zargham et al.

(10) Patent No.: US 7,050,555 B2
(45) Date of Patent: May 23, 2006

(54) SYSTEM AND METHOD FOR MANAGING INTERCONNECT CARRIER ROUTING

(75) Inventors: Shawn Zargham, Rockville, MD (US); Amir Yazdanpanah, Washington, DC (US); Hormoz Hekmat, Bethesda, MD (US)

(73) Assignee: Telarix, Inc., Vienna, VA (US)

( * ) Notice: Subject to any disclaimer, the term of this patent is extended or adjusted under 35 U.S.C. 154(b) by 735 days.

(21) Appl. No.: 10/320,616

(22) Filed: Dec. 17, 2002

(65) Prior Publication Data

US 2003/0229613 A1 Dec. 11, 2003

Related U.S. Application Data

(60) Provisional application No. 60/341,230, filed on Dec. 20, 2001.

(51) Int. Cl.
H04M 15/00 (2006.01)
H04M 3/42 (2006.01)

(52) U.S. Cl. ............................ 379/115.01; 379/112.01; 379/112.05; 379/112.07; 379/121.01; 379/122; 379/137; 379/221.07

(58) Field of Classification Search ................ 379/111, 379/112.01, 112.05, 112.06, 112.07, 112.08, 379/114.01, 115.01, 121.01, 122, 133–137, 379/220.01, 221.07, 221.14
See application file for complete search history.

(56) References Cited

U.S. PATENT DOCUMENTS

| | | | |
|---|---|---|---|
| 5,065,393 A | 11/1991 | Sibbitt et al. | |
| 5,270,919 A | 12/1993 | Blake et al. | |
| 5,359,649 A | 10/1994 | Rosu et al. | |
| 5,790,642 A | 8/1998 | Taylor et al. | |
| 5,892,822 A | 4/1999 | Gottlieb et al. | |
| 5,903,638 A | 5/1999 | Welter, Jr. et al. | |
| 5,937,042 A * | 8/1999 | Sofman ................ | 379/112.05 |
| 5,946,295 A | 8/1999 | Sofman et al. | |
| 5,982,869 A | 11/1999 | Lozano et al. | |
| 6,005,926 A | 12/1999 | Mashinsky | |
| 6,144,727 A | 11/2000 | Mashinsky | |
| 6,226,365 B1 | 5/2001 | Mashinsky | |
| 6,421,434 B1 | 7/2002 | Rosu | |
| 6,421,435 B1 * | 7/2002 | Bastien et al. ............. | 379/133 |
| 6,442,258 B1 | 8/2002 | Mashinsky | |
| 6,542,588 B1 | 4/2003 | Mashinsky | |
| 6,542,593 B1 * | 4/2003 | Bowman-Amuah .... | 379/201.03 |
| 6,598,034 B1 * | 7/2003 | Kloth ......................... | 706/47 |
| 6,606,744 B1 * | 8/2003 | Mikurak ..................... | 717/174 |
| 6,671,818 B1 * | 12/2003 | Mikurak ........................ | 714/4 |
| 6,950,407 B1 * | 9/2005 | Huddle ....................... | 370/254 |
| 2003/0020977 A1 * | 1/2003 | Smith et al. ................. | 359/110 |
| 2003/0088529 A1 * | 5/2003 | Klinker et al. ................ | 706/3 |
| 2005/0083844 A1 * | 4/2005 | Zhu et al. ................ | 370/230.1 |

FOREIGN PATENT DOCUMENTS

| | | |
|---|---|---|
| WO | PCT/US02/40345 | 12/2002 |
| WO | WO 03/055235 A2 * | 7/2003 |

* cited by examiner

Primary Examiner—Binh K. Tieu
(74) Attorney, Agent, or Firm—Morrison & Foerster LLP

(57) ABSTRACT

A system and method for managing a carrier's interconnect traffic across a telecommunications network, the method involving receiving cost and routing rules from the carrier, gathering performance data corresponding to the interconnect traffic, applying the cost and routing rules to the performance data to determine a first impact on the interconnect traffic, receiving superseding routing rules from the carrier, automatically calculating proposed changes in network routing based on the superseding routing rules and the first impact, and presenting the proposed changes to the carrier.

31 Claims, 18 Drawing Sheets

| | | \multicolumn{5}{c|}{SCOPE} | | | | |
|---|---|---|---|---|---|---|
| | | ROUTING ELEMENT | ROUTE CLASS | DESTINATION | EFFECTIVE DATE | SAMPLING PERIOD |
| 500 | CONSIDER OUTBOUND TRUNKS | √ | | | | |
| 502 | GET OVERRIDE INSTRUCTIONS | √ | √ | √ | √ | |
| 504 | ELIMINATE EXCLUDED TRUNKS | √ | √ | | | |
| 506 | AVOID ACCOUNT/TRUNK LOOPING | √ | √ | √ | | √ |
| 508 | REMOVE INTER-MACHINE TRUNK (IMT) RATES | √ | √ | √ | | |
| 510 | ELIMINATE TRUNKS WITH NO RATES | √ | √ | √ | | |
| 512 | FILTER BASED ON THE MARGIN | √ | √ | √ | | √ |
| 514 | FILTER BASED ON ASR | √ | √ | √ | | √ |
| 516 | FILTER BASED ON CAPACITY | √ | √ | | | √ |
| 518 | RANK BY COST AND FILTERS | √ | √ | √ | √ | |
| 520 | APPLY OVERRIDE RANKING INSTRUC. | √ | √ | √ | √ | |
| 522 | MAINTAIN A MIN. NO. OF ROUTES | √ | √ | √ | | |
| 524 | DETERMINE IMT COST | √ | √ | √ | | √ |
| 526 | FILTER BASED ON THE MARGIN | √ | √ | √ | | √ |
| 528 | RANK BY COST AND FILTERS | √ | √ | √ | √ | |
| 530 | APPLY OVERRIDE RANKING INSTRUC. | √ | √ | √ | √ | |
| 532 | AVOID NETWORK LOOPING | √ | √ | √ | | |
| 534 | RANK BY COST AND FILTERS | √ | √ | √ | √ | |
| 536 | APPLY OVERRIDE RANKING INSTRUC. | √ | √ | √ | √ | |
| 538 | MAINTAIN A MIN. NO. OF ROUTES | √ | √ | √ | | |
| 540 | KEEP A MAX. NO. OF ROUTES | √ | √ | √ | | |

| Breakeven Analysis | | | | | XYZ Telecom | |
| --- | --- | --- | --- | --- | --- | --- |
| Switch:SW-1 | Rate Type: Standard | | Route Class: Gold Class | | Date: 3/1/01 | |
| Destination | Route 1 | Route 2 | Route 3 | Blended Cost | Overhead | Breakeven |
| American Samoa-7 | 0.4343 | 0.4788 | 265.9734 | 0.4432 | 0.0322 | 0.4754 |
| American Samoa-9 | 0.4343 | 1.2076 | 265.9734 | 0.5890 | 0.0394 | 0.6284 |
| American Samoa-Mobile | 0.4343 | 0.4788 | 265.9734 | 0.4432 | 0.0322 | 0.4754 |
| Australia-1 | 0.0790 | 0.0805 | 265.9734 | 0.0793 | 0.0140 | 0.0933 |
| Australia-3 | 0.3751 | 0.3948 | 265.9734 | 0.3790 | 0.0290 | 0.4080 |
| Australia-4 | 0.0505 | 0.0749 | 265.9734 | 0.0554 | 0.0128 | 0.0681 |
| Australia-5 | 0.0505 | 0.0749 | 265.9734 | 0.0554 | 0.0128 | 0.0681 |
| Benin-2 | 0.7022 | 0.7421 | 265.9734 | 0.7102 | 0.0455 | 0.7557 |
| Burkina Faso-9 | 1.0161 | 1.0659 | 265.9734 | 1.0261 | 0.0613 | 1.0874 |
| Chile-1 | 0.0223 | 0.0400 | 0.3064 | 0.0258 | 0.0113 | 0.0371 |
| Chile-4 | 0.1596 | 0.2763 | 265.9734 | 0.1829 | 0.0191 | 0.2021 |
| Chile-5 | 0.2527 | 0.2763 | 265.9734 | 0.2574 | 0.0229 | 0.2803 |
| Cuba-2 | 0.2289 | 1.5534 | 265.9734 | 0.4938 | 0.0347 | 0.5285 |
| El Salvador-1 | 0.3553 | 0.3658 | 0.3658 | 0.3574 | 0.0279 | 0.3853 |
| El Salvador-2 | 0.4735 | 0.6119 | 265.9734 | 0.5012 | 0.0351 | 0.5362 |
| French Antilles-7 | 0.2968 | 0.5559 | 265.9734 | 0.3486 | 0.0274 | 0.3761 |
| Greenland-9 | 0.4452 | 0.5054 | 265.9734 | 0.4572 | 0.0329 | 0.4901 |
| Honduras-1 | 0.7244 | 0.9576 | 265.9734 | 0.7710 | 0.0486 | 0.8196 |
| Iridium-9 | 12.7793 | 19.4180 | 265.9734 | 14.1070 | 0.7154 | 14.8224 |
| Korea North-6 | 1.3938 | 1.7370 | 265.9734 | 1.4624 | 0.0831 | 1.5456 |
| Liechtenstein-1 | 0.1800 | 0.1862 | 265.9734 | 0.1812 | 0.0191 | 0.2003 |
| Malta-3 | 0.3265 | 0.3458 | 265.9734 | 0.3304 | 0.0265 | 0.3569 |
| Monaco-0 | 0.2073 | 0.5320 | 265.9734 | 0.2722 | 0.0236 | 0.2959 |
| Monaco-7 | 0.3553 | 0.5320 | 265.9734 | 0.3906 | 0.0295 | 0.4202 |
| Netherlands-2 | 0.0632 | 0.1170 | 265.9734 | 0.0740 | 0.0137 | 0.0877 |
| Netherlands-3 | 0.0592 | 0.1170 | 265.9734 | 0.0708 | 0.0135 | 0.0843 |
| Netherlands-4 | 0.1197 | 0.3948 | 265.9734 | 0.1747 | 0.0187 | 0.1935 |
| Netherlands-5 | 0.0632 | 0.1170 | 265.9734 | 0.0740 | 0.0137 | 0.0877 |
| New Destination | 0.4343 | 0.4788 | 265.9734 | 0.4432 | 0.0322 | 0.4754 |
| Oman-3 | 0.7262 | 1.0856 | 265.9734 | 0.7981 | 0.0499 | 0.8480 |
| Puerto Rico-9 | 0.0508 | 265.9734 | 265.9734 | 53.2673 | 2.6734 | 55.9407 |

SYSTEM AND METHOD FOR MANAGING INTERCONNECT CARRIER ROUTING

This application claims the benefit of U.S. Provisional Application No. 60/341,230, filed Dec. 20, 2001, which is herein incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to international call traffic routing, and more particularly, to a system and method for optimizing the routing of international call traffic based on parameters such as financial data, quality of service requirements, and individual business exceptions.

2. Background of the Invention

As a result of deregulation, telecommunication carriers can now interconnect with other carriers when it is not possible to complete an end-to-end call entirely on a single carrier's network in the most efficient way. Referring to FIG. 1, a call may originate within carrier A's network and terminate on carrier B's network. Alternatively, in a more complicated scenario, a call originates on carrier A's network, transits through carrier B's network, and then terminates on carrier C's network. In that case, carrier A must interconnect with carrier B and carrier B must interconnect with carrier C. These new routing options force carriers to establish and manage multiple interconnect agreements in order to optimize the use of their networks, reduce costs, and increase margins.

Operating in an intensely competitive and dynamic environment that is characterized by declining prices and shrinking margins, interconnect carriers must continually optimize network operations in response to market pressures. To succeed in this marketplace, interconnect facilities require real-time access to critical business and traffic information, which can be used to evaluate network optimization and deficiencies, and efficiently reach and implement critical business decisions. Examples of these critical business decisions include trading and negotiating with customers and vendors, monitoring traffic, costs, and revenues, evaluating trading (buy and sell) opportunities, determining optimized routing, and tuning network routing and bandwidth.

As demonstrated in FIG. 1, with the deregulation of various telephony markets and the emergence of several new industry players, more and more carriers must go beyond their network and rely on their interconnect partners to deliver a substantial part of their offerings. As the telecommunication markets and services mature, these inter-carrier relationships evolve through a life cycle that can be categorized into four stages: peering arrangements; bilateral agreements; negotiated commerce; and real-time exchanges.

In a peering arrangement, a few known players agree to exchange traffic among themselves based on the peering principle that all parties are equal and that no inter-party compensation is necessary. Because inter-network traffic measurements are not required for accounting purposes, the traffic is only measured for network capacity planning and network performance monitoring.

A bilateral agreement is usually between two carriers and typically specifies how they will exchange termination services. The party that sends more traffic compensates the other party based on the amount of traffic surplus. In this case, inter-network traffic measurements are required for settlement purposes. However, because the parties typically settle the account balances on a periodic basis, traffic information is also only aggregated periodically (e.g., monthly), and not in real-time.

In a negotiated commerce environment, each carrier charges for its termination services based on a set of specific tariffs that have been negotiated with other carriers. In this case, the inter-carrier relationship has more of a customer/vendor flavor. Accurate traffic measurement and storage of detail records of each transaction is a prerequisite for conducting business in this manner. The billing and costing may be done at the aggregate usage level, but detail records may be required to support the charges.

When the supporting networks and business infrastructures permit, carriers may consider a real-time exchange of some of their inter-network services. A few pioneering companies are pushing the envelope by setting up public exchanges for minutes and bandwidth.

One indicator of the evolution of the inter-carrier relationship is the magnitude of the interconnect costs and revenues as a percentage of the total figures. Some of the oldest and the most advanced inter-carrier relationships can be found in the international voice market today, where the interconnect costs can be significant. Traditionally, the bulk of international voice traffic has been exchanged between various national carriers' networks (Postal, Telephone, and Telegraph companies, or "PTTs") based on accounting rates and bilateral agreements. Recent trends in international telephony point to the continued emergence of a more market orientated inter-carrier relationship that can be characterized as negotiated commerce.

As the interconnect costs begin to rival their network and operating expenses, more and more carriers and service providers are becoming aware of the need to better manage their inter-carrier relationships. A key component of this strategy is the optimization of the inter-network traffic, which can immediately lower costs and improve quality of service. Unfortunately, the prior art lacks the tools to track carrier relationships and to optimize inter-network traffic.

SUMMARY OF THE INVENTION

The present invention is a unique, comprehensive, web-based system and method for managing interconnect and wholesale telecommunication businesses in real-time. The present invention is especially useful for facilities-based carriers that are engaged in buying and selling termination and origination traffic through interconnect arrangements. In particular, the present invention manages traffic, revenues, and costs, to help carriers maximize revenues, reduce network costs, optimize network routing, and increase overall profitability and service quality. In so doing, the present invention helps telecommunication carriers reach their full potential by providing real-time intelligent traffic management services. In essence, the present invention provides a decision support system for all functional areas of the interconnect business, such as sales, network operations, and cost management.

The present invention provides support for both front- and back-office business functions such as workflow management for trading operations, call detail record (CDR) processing, call quality tracking, financial reporting, and billing and settlement. In addition, the present invention transforms call traffic data into business intelligence, by providing real-time usage analysis of outbound traffic volumes and costs by destination, switch, and origination.

To provide route optimization, an embodiment of the present invention dynamically updates a central database with real-time, route-related information. This route-related information includes parameters such as traffic volumes, network usage, and network capacity. Based on data from the central database, the present invention then facilitates the managing, controlling, and reporting of cost and routing cases. These cases form the basis on which carriers can make critical routing decisions. To help carriers reach decisions in a timely manner, the present invention further provides automated business processes using workflow and electronic alerts that inform a carrier when thresholds have been reached.

An embodiment of the present invention provides a method for managing a carrier's interconnect traffic across a telecommunications network. This exemplary method involves receiving cost and routing rules from the carrier, gathering performance data corresponding to the interconnect traffic, applying the cost and routing rules to the performance data to determine a first impact on the interconnect traffic, receiving superseding routing rules from the carrier, automatically calculating proposed changes in network routing based on the superseding routing rules and the first impact, and presenting the proposed changes to the carrier.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

BRIEF DESCRIPTION OF THE DRAWINGS

FIG. 5B is a table illustrating an exemplary method for analyzing interconnect traffic routing, according to an embodiment of the present invention.

FIGS. 6 and 7 are screen images of representative graphical user interfaces through which users can view routing data and can view criteria necessary to make routing decisions, according to an embodiment of the present invention.

FIG. 13 is a screen image of an exemplary graphical user interface presenting a breakeven analysis, according to an embodiment of the present invention.

FIG. 15 is a screen image of an exemplary graphical user interface presenting a destination answer-to-seize ratio report with inbound and outbound trunk information, according to an embodiment of the present invention.

DETAILED DESCRIPTION OF THE INVENTION

Figure 1:
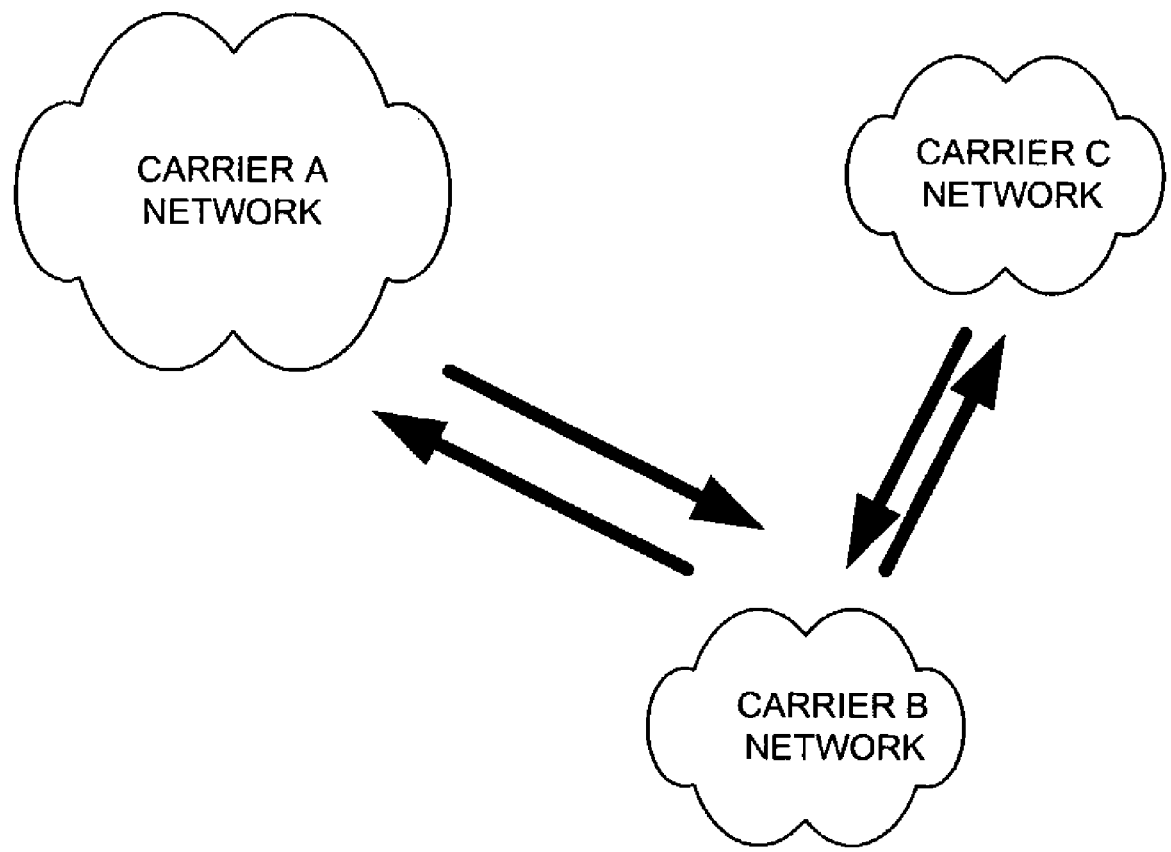
FIG. 1 is a schematic diagram that illustrates the interconnection of carriers for refile and transit traffic exchange.
Figure 2:
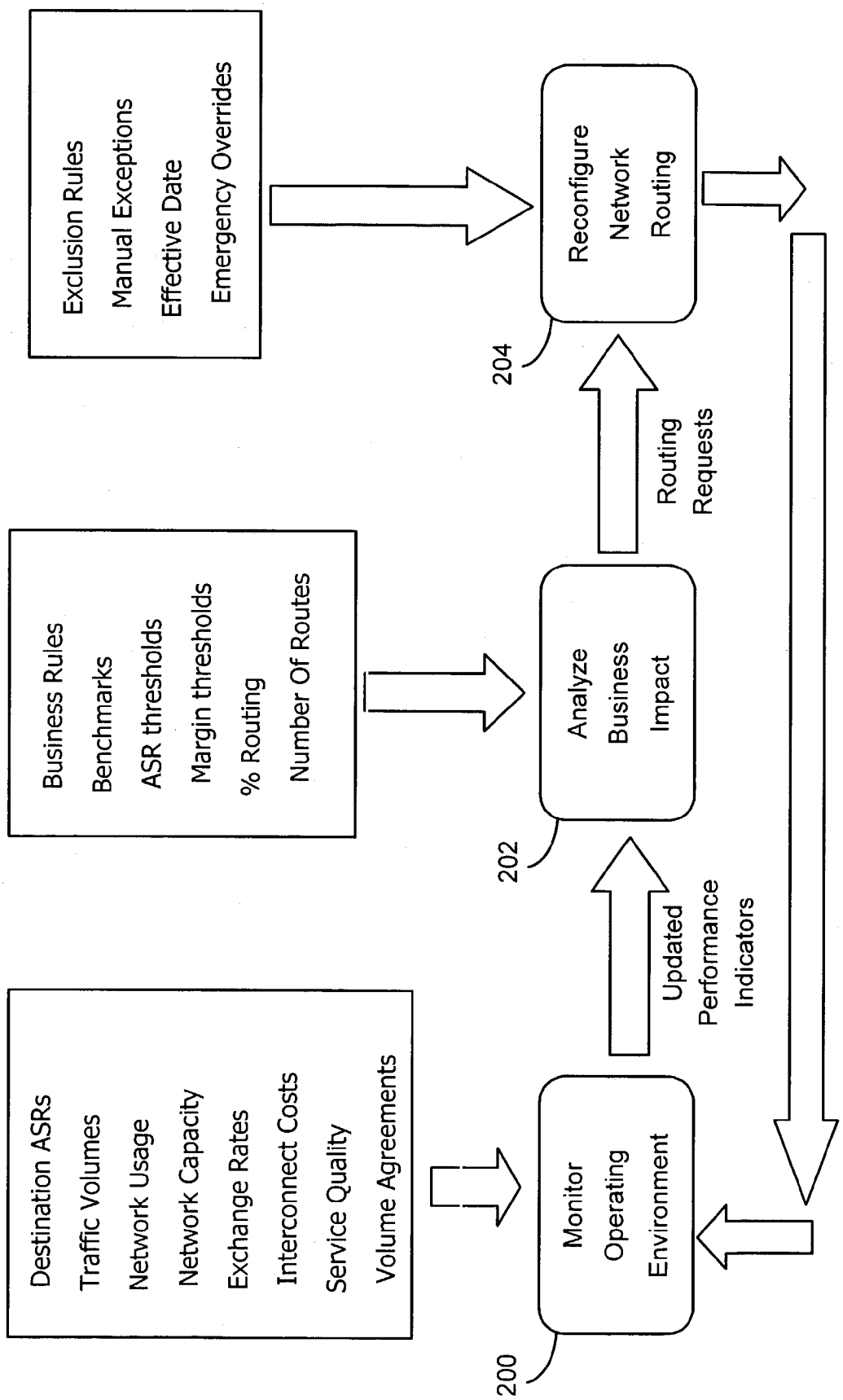
FIG. 2 is a schematic diagram that illustrates an exemplary method for managing interconnect traffic, according to an embodiment of the present invention.

FIG. 2 illustrates an exemplary method for managing interconnect traffic, according to an embodiment of the present invention. As shown, the method cycles between the three primary steps of monitoring the operating environment 200, analyzing business impact 202, and reconfiguring network routing 204. This cyclical approach accounts for the constantly changing traffic routing and cost options.

In monitoring the operating environment, step 200 involves gathering cost and routing data. As shown, this data includes parameters such as destination answer-to-seize ratios (ASRs), traffic volumes, network usage, network capacity, exchange rates, interconnect costs, service quality, and volume agreements. Gathering this data preferably occurs in real-time, or at least periodically, as necessary to keep pace with the changing network traffic environment.

After compiling the data, step 202 analyzes the business impact of the data by applying carrier-defined cost and routing rules. As shown, these rules include, for example, business rules, benchmarks, answer-to-seize ratio thresholds, margin thresholds, percentage routing, and number of routes. After applying a rule, the analysis results in either a need for action (e.g., if a threshold has been reached) or no need for action. If action is needed, then the analysis concludes by requesting that a new traffic routing be calculated to address changes in the operating environment.

Accordingly, the method continues in step 204 with the reconfiguration of network routing. In calculating the new routing, the method applies novel routing analyses (discussed in more detail below) and considers superseding routing parameters such as carrier-defined exclusion rules, manual exceptions, effective dates, and emergency overrides. After the carrier approves the new routing, the routing is implemented. The cycle then continues by gathering real-time data associated with the new routing and monitoring the operating environment, i.e., by returning to step 200.

Figure 3:
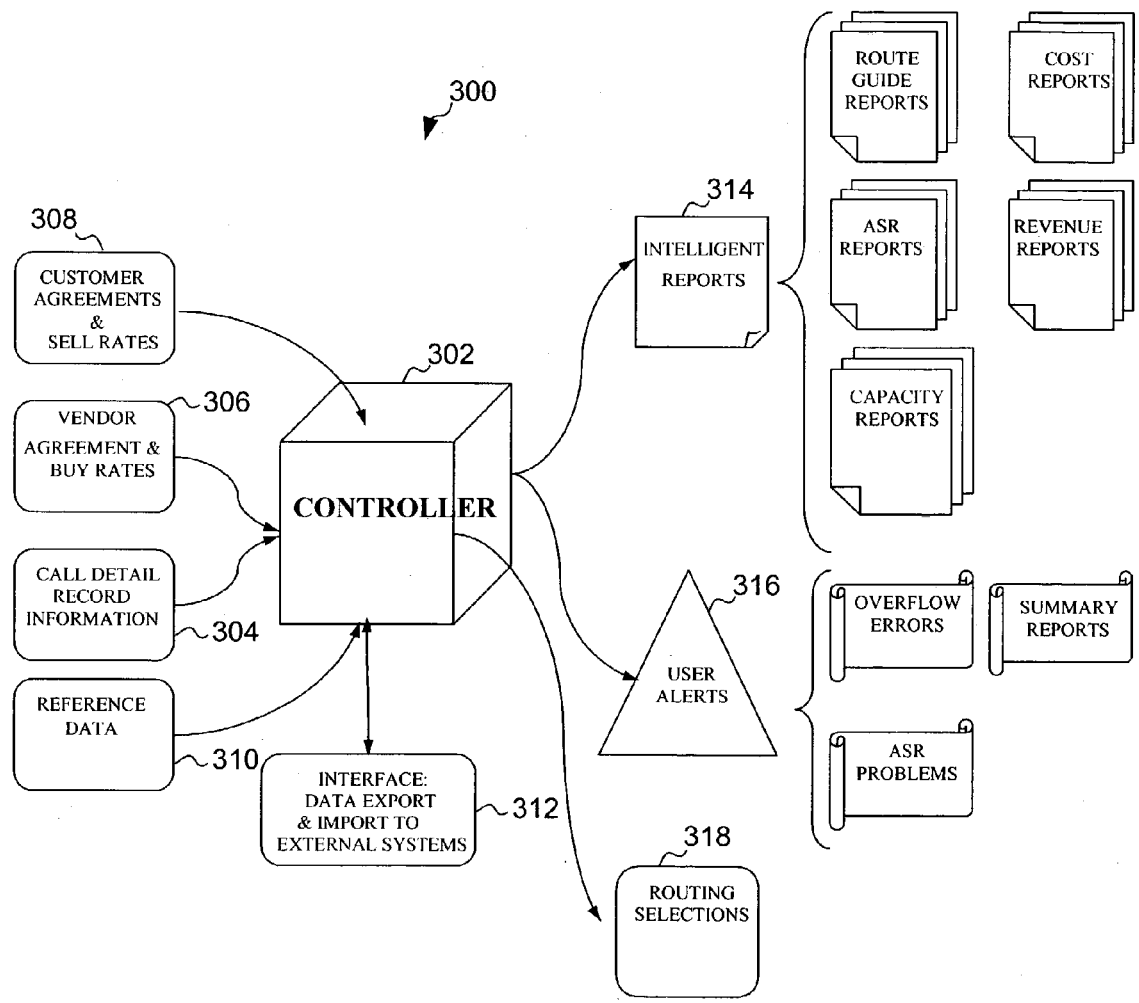
FIG. 3 is a schematic diagram that illustrates an exemplary system for managing interconnect traffic, according to an embodiment of the present invention.

Referring to FIG. 3, according to an embodiment of the present invention, system 300 includes a controller 302 that automatically manages the collection and processing of CDR data 304 from mediation devices or CDR collectors, which collect charging information from the switches. This feature allows the present invention to process data 304 as it becomes available and, hence, to provide a real-time view of a business. Controller 302 preferably includes a transaction processing interface that can accept CDRs in their raw or summarized/aggregated format, as they become available.

System 300 also includes a database 306 for maintaining and managing interconnect agreements with vendors and/or carriers. Database 306 contains information such as physical interconnect details, buy rates by destination, and rate plans. Users can export/import, add, change, and delete this information through interface 312. Interface 312 is, for example, a web-based user interface or an interface through which a user can upload data using text or standard spreadsheet software files (e.g., EXCEL™ files). Controller 302 uses database 306 to calculate least cost route guides for each quality of service level that a vendor provides.

System 300 also includes a database 308 for maintaining and managing interconnect agreements with customers and/or suppliers. Database 308 contains information such as interconnect details, sell rates by destination, and rate plans. As with database 306, users can export/import, add, change, and delete this information through interface 312. Controller 302 uses database 308 to identify the cost and revenue associated with each call based on the interconnect agreements that are in place.

System 300 also includes a relational database 310 for storing reference data and business rules information. Database 310 contains calculation parameters such as quality of service thresholds. As another example, the calculation parameters could be ASR benchmarks used for routing decisions by the system. The reference data could be the numbering plan used for determining the termination destination from the called number. Users can add, change, and delete this reference information to implement the desired operation of the system. Controller 302 uses database 310 to calculate optimum network routing selections. The algorithm of controller 302 considers the benchmarks specified by the users and the current traffic conditions to determine the optimum routing sequences.

Using the data provided by databases 304, 306, 308, and 310 and interface 312, controller 302 performs various rating and analytical functions. For example, controller 302 rates CDRs associated with the interconnection traffic and uses vendor database 306, customer database 308, and reference database 310 to produce real-time business intelligence. Controller 302 also creates a multi-dimensional data store, which is subsequently used for the outputs of system 300, including intelligence reports 314, user alerts 316, and routing selections 318.

For intelligence reports 314, controller 302 provides a large number of standard reports to address the different reporting and analysis needs of any carrier. As shown in FIG. 3, examples of these reports include route guide reports, cost reports, ASR reports, revenue reports, and capacity reports. Users can access the reports using interface 312, e.g., a web interface. Reports 314 are flexible and provide the users with the ability to summarize and sort information using many of the available dimensions. In addition, the reporting engine of controller 302 supports charts and graphs, allows for exporting of report data to standard word processing and spreadsheet software, and provides drill-down functionality that allows viewing of the data at a more granular level.

For user alerts 316, controller 302 provides alerting capabilities, which can support exception management. Alerts 316 provide a mechanism to generate and send alert notifications to users through email or web pages, for example. The user can define business rules that should result in an alert condition. For example, the user may wish to receive an alert when traffic volume to a specific vendor drops below a certain threshold level. As controller 302 processes CDR data, it generates an alert and sends an email to the appropriate contact(s) when the conditions of the business rule are met. As shown in FIG. 3, other business rules could include overflow errors, summary reports, and ASR problems.

For routing selections 318, controller 302 combines all of the information associated with a current routing scheme from the databases 304, 306, 308, and 310, such as costs, traffic volume, traffic quality (ASR), routing, and termination vendors, and executes a complex routing analysis. Broadly described, controller 302 retrieves from the reference and rules database 310 calculation parameters, such as quality of service thresholds, to determine and recommend optimum network routing selections 318. Through interface 312, a user can then interact with controller 302 to review the analysis of the optimum route choices and decide whether to override and modify the recommendations, or simply submit the routing requests for implementation. Interface 312 is preferably an open system interface, which allows for simple integration with external systems and which facilitates the automatic uploading of routing requests to the switches. The following discussion, under the subheading "Routing," describes the routing analysis.

Routing

Referring to FIG. 3, controller 302 uses a multi-node routing analysis that determines the optimal way of terminating traffic to an external destination from a network that includes multiple routing nodes. Each routing node may be, for example, a single switch, a collection of switches, a Voice-Over-Internet-Protocol (VoIP) gateway, or a signaling point. The route guide is defined for each node, each route class, and each destination, and consists of an ordered list of the preferred outbound carriers/trunks with corresponding routing percentages. The optimization provided by this analytical method goes beyond the traditional least cost routing (LCR) to incorporate other business criteria, such as quality of service, profit margin, bilateral agreements, available capacity, network looping, inter-carrier looping, and minimum and maximum number of selected routes. The method of analysis includes an extensible set of sequential instructions that are capable of supporting additional business criteria.

The routing analysis operates within an inter-network architecture in which each carrier controls a network that consists of a collection of routing nodes. These networks are interconnected with one another through trunks that can carry the traffic flow between the networks. A carrier can use the routing analysis to identify the optimal manner by which to terminate traffic to destinations that are both inside and outside of a carrier's network.

The routing is controlled through a configurable analytical method and a set of user-defined benchmarks. The analytical method can support different routing needs by assigning a route class to different sets of analytical steps and benchmarks. For example, a platinum route class may be configured to be more quality focused, a gold route class may be more value focused, and a silver route class may be more cost focused.

A routing node may be a single network element or may contain of a number of network elements. The route guide specifies the routing for all of the network elements within a routing node.

Figure 4:
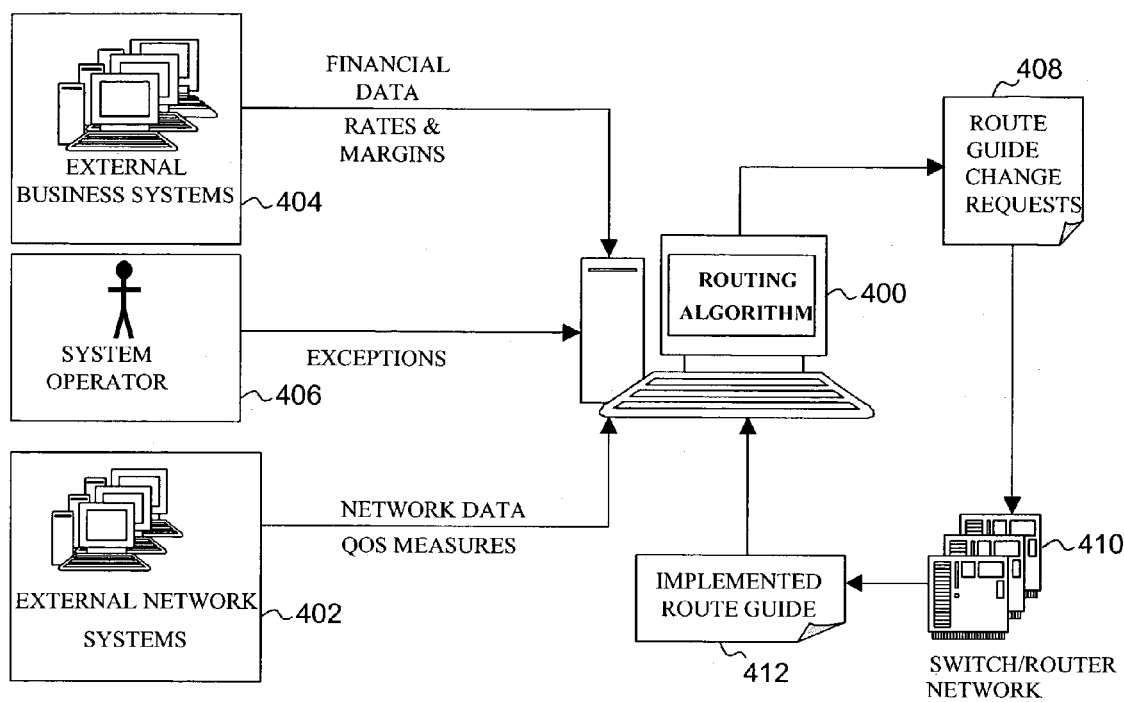
FIG. 4 is a schematic diagram that illustrates an exemplary system and method for routing interconnect traffic, according to an embodiment of the present invention.

As shown in FIG. 4, the routing analyzer 400 combines traffic data 402, economical quantities 404, and user-defined parameters and directives 406 to determine the desired routing 408. Historical traffic data is considered based on a user-definable sampling period. The routing 408 is then implemented through the switch/router network 410 and is reported back to the routing analyzer 400 in the form of an implemented route guide 412. The routing analyzer 400 then repeats the process in response to new data received from the network systems 402, the business systems 404, and the system operator 406.

According to an embodiment of the present invention, the routing analysis combines traffic data, economical figures, and user-defined parameters and directives to determine desired routing. Broadly defined, this routing analysis involves the steps shown in the flowchart of FIG. 5A.

As shown, in step 580, the routing analysis begins by identifying all trunks that are capable of carrying outbound traffic. Then, for each of the possible trunks identified in step 580, the analysis continues by applying optimization criteria in step 582. Applying optimization criteria could include, for example, calculating traffic and cost criteria. The traffic criteria could be, for example, calculations of answer-to-seize ratios and trunk capacities. The cost criteria could be, for example, inter-machine trunk rates and trunk margins. In general, optimization criteria could include any of the well known methods of least cost routing and traffic optimization.

Having calculated the traffic and cost data, in step 584, the routing analysis continues by ranking and filtering the trunks based on the data. Trunks that fail to satisfy predetermined thresholds are filtered out. The remaining trunks are ranked to identify optimal trunks.

In step 586, the routing analysis applies override instructions to the ranking. The user of the system provides these instructions as rules that take precedence over any traffic or cost criteria.

Finally, with the rankings adjusted to accommodate the override instructions, the routing analysis ends by reporting the route guide to the user in step 588. This route guide presents the available trunks in order of preference.

Figure 5A:
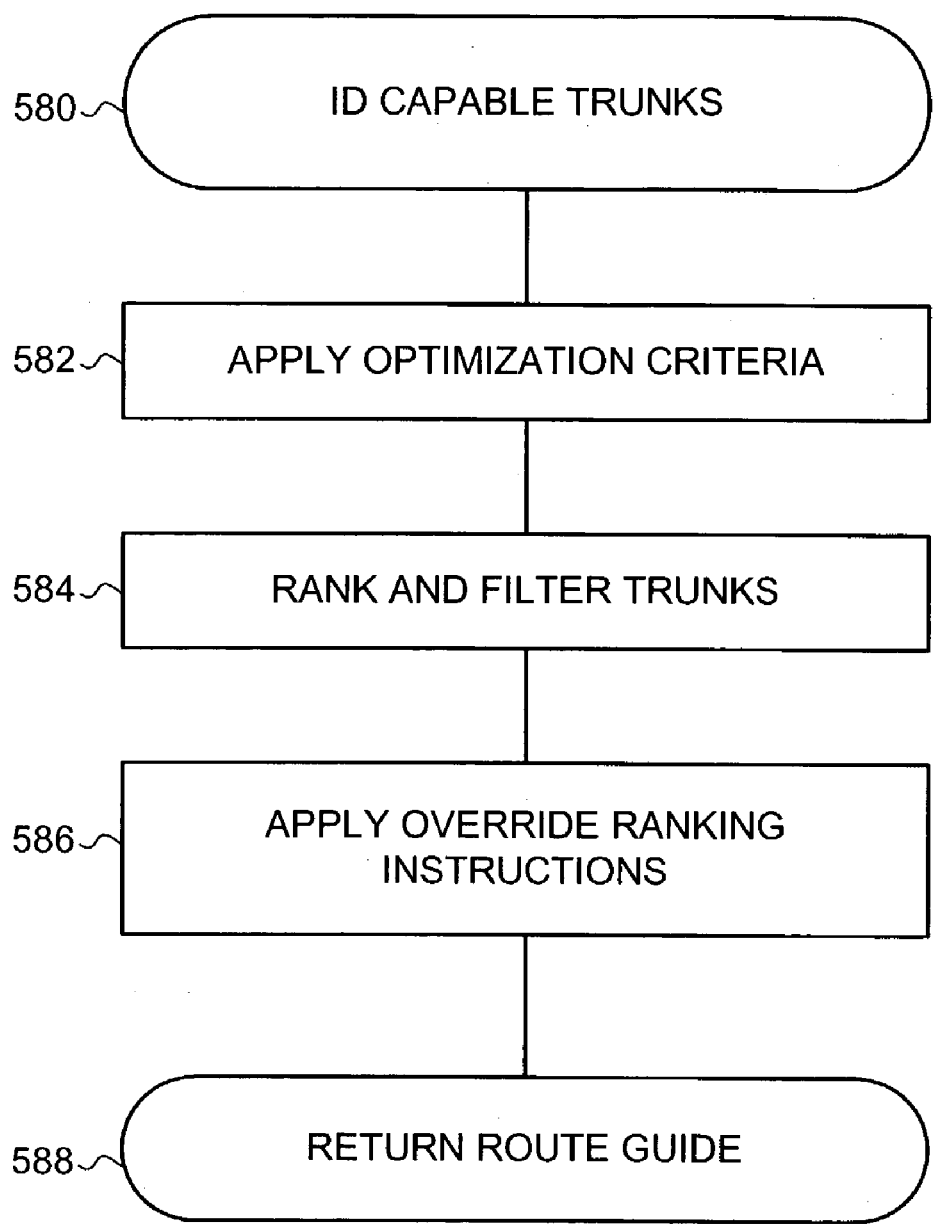
FIG. 5A is a flowchart outlining an exemplary method for analyzing interconnect traffic routing, according to an embodiment of the present invention.

As shown in FIG. 5A, the routing analysis involves a series of iterative steps that determine the route guide by applying various filters and ranking logic. The process can repeat as many times as necessary to accommodate changing traffic and market conditions. In addition, the make-up and order of the steps can be modified to impact the route guide.

The routing analysis is extensible in two ways. First, the make-up of the instructions involved in executing steps of FIG. 5A can be modified to include or exclude various business requirements. Second, the order of applying the instructions can also be changed to affect the outcome of the optimization. Another distinguishing feature of the routing analysis is the incorporation of user-defined benchmarks that define some of the acceptable business thresholds.

FIG. 5B outlines a specific embodiment of the routing analysis. In this example, the route guide depends on one or more variables and one parameter. The parameter is the sampling period, which defines the historical period over which the traffic data is considered. For example, the sampling period may be the last hour, yesterday, or the last 48 hours. With this parameter fixed, the route guide is then defined in a multi-dimensional space defined by one or more of the following variables: routing element (or node), route class, destination, and effective date.

Each step of the routing analysis uses one or more of these variables, as defined by the scope of the step. The scope therefore determines the domain of impact on the variables. For example, identifying trunks that are capable of carrying outbound traffic (for example, step 500 in FIG. 5B) depends only on the routing element, whereas applying operator override instructions (for example, step 520 in FIG. 5B) impacts the entire routing space.

Column 1 of the table of FIG. 5B describes the steps of the routing analysis. Columns 2–6 list the scope applicable to each step, which includes the variables and parameter mentioned above. The scope, corresponding to the variables of the routing analysis, can include one or more of: 1) Routing Element; 2) Route Class; 3) Destination; 4) Effective Date; and 5) Sampling Period. Routing Element refers to a collection of one or more network elements that use the same route guide (e.g., multiple VoIP switches with a common route guide). Route Class is an attribute of the route guide that supports the use of different route guides for various business requirements (e.g., routing based on quality of service can be done using three route classes: Platinum, Gold, and Silver). Destination refers to a collection of dialed digits that point to a geographic or non-geographic termination point of a telephone call. Effective Date refers to the date for which the financial data is evaluated and the route guide is suggested (e.g., today). Sampling Period is the period before the effective date during which the routing algorithm analyzes the traffic data (e.g., yesterday).

In FIG. 5B, the method of routing analysis begins in step 500 by identifying all available outbound trunks, which are the trunks that are capable of carrying outbound traffic.

In step 502, the method obtains the override instructions provided by the network operator. These instructions dictate special circumstances under which routing must adhere to a particular, overriding rule. For example, the instructions can include route exclusions, route inclusions, and specified rankings. An exclusion acts as a filter to prevent certain trunks from further consideration. An inclusion acts as "de-filter" that turns other filters off. Specific rankings (described below) also act as a filter to prevent cost-based ranking algorithms from considering certain trunks.

The next step (step 504) is to eliminate excluded trunks. These excluded trunks include the trunks that the network operator identified to be excluded from consideration.

In step 506, the method examines the account and/or trunk that is sending the traffic to avoid looping the traffic back to that account and/or trunk. In other words, the method avoids routing traffic to an account and/or trunk that is sending the traffic to the network-.

In step 508, the method clears the inter-machine trunk (IMT) rates so that the IMT rates are not considered for switch-level routing at this point.

In step 510, trunks having no rates are eliminated. This elimination includes the IMTs.

In step 512, the method filters the remaining outbound trunks based on margin. Specifically, for each remaining available outbound trunk, the method calculates the trunk's margin as defined by a list price minus trunk cost divided by the list price, where the list price is obtained from an externally defined price list. If the trunk margin is lower than a designated margin benchmark, then that particular trunk is removed from consideration.

In step 514, the method filters based on traffic quality, as measured by, for example, answer-to-seize ratios (ASRs). For each remaining available trunk, if the number of seized calls is statistically significant (e.g., more than 200), then the method calculates the trunk ASR by dividing the number of answered calls by the number of the seized calls. If a trunk has an ASR lower than a designated ASR benchmark, then that trunk is removed from consideration.

In step 516, the method filters based on capacity. For each remaining available trunk, the method calculates the available capacity by considering the peak sample period usage. A filter is removed from consideration if peak usage is greater than the value allowed by a designated benchmark.

In step 518, the method ranks the remaining available routes by cost. The method does not consider, i.e., rank, trunks that have been removed in the previous filtering steps.

In step 520, the override ranking instructions that were identified in step 502 are applied to the rankings of the remaining available trunks. In this manner, the method adjusts the rankings to place the operator rank specific overrides in the right position.

In step 522, the method ensures that the number of remaining available trunks is greater than or equal to a minimum number of routes needed to continue the routing analysis. If there are not enough routes left on the route guide, then the method turns off or adjusts one or more of the filters to bring previously filtered trunks back into consideration, such that the number of remaining available trunks satisfies the required minimum number of routes.

In step 524, the method determines the IMT cost. The IMT cost is based on a blending of the calculated route guide up to this point in the process, which includes non-IMT routes only. The blended cost for each switch is assigned to all IMTs that terminate to that switch.

In step 526, the method again filters based on the margin. With the IMT rates calculated, the method recalculates the margins and eliminates the IMT routes that have margins below a designated benchmark.

In step 528, the method again ranks the remaining available trunks by cost. This second time, however, the IMTs are included. Any trunks that have been filtered out are not ranked.

In step 530, the method again applies the override ranking instructions provided by the network operator in step 502. Specifically, the method adjusts the rankings to place the operator's rank specific overrides in the correct position.

In step 532, the method evaluates the possibility of network looping and removes the trunks that could cause such looping. For example, the method eliminates IMTs that could potentially cause looping between switches.

After eliminating the looping IMTs, in step 534, the method again ranks the remaining available trunks according to cost. The method does not rank the trunks and IMTs that were removed in the filtering steps.

In step 536, the method again applies the override ranking instructions provided by the network operator in the same manner as described above.

After the additional IMT filtering steps, in step 538, the method evaluates whether the number of remaining available trunks is greater than or equal to a minimum number of routes needed to choose a routing option. If there are not enough routes left on the route guide, then the method turns off or adjusts one or more of the filters to bring previously filtered trunks back into consideration, such that the number of remaining available trunks satisfies the required minimum number of routes.

Finally, in step 540, the method evaluates whether the number of remaining available trunks is greater than a designated maximum number of routes allowed. The maximum number corresponds to the number of routes that a network operator can reasonably consider in choosing a call traffic route. If the number of remaining available trunks exceeds the maximum number, then the method eliminates the excess trunks. The excess trunks are preferably the lowest ranked trunks.

Figure 6:
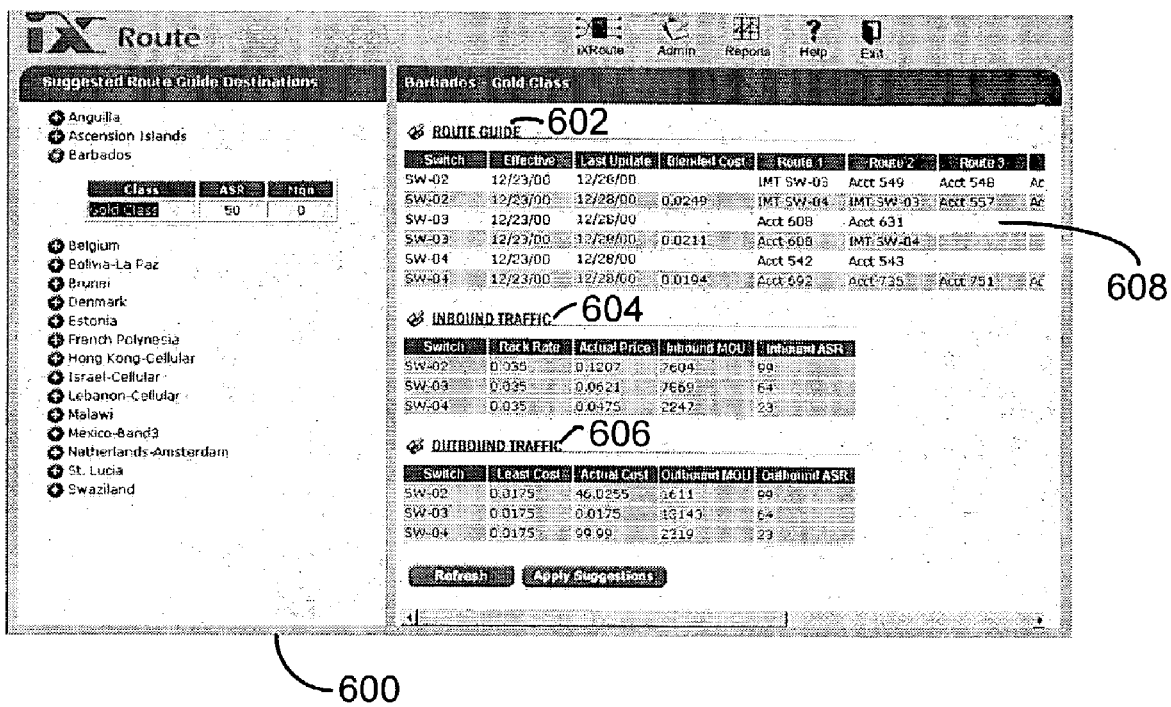
Figure 7:
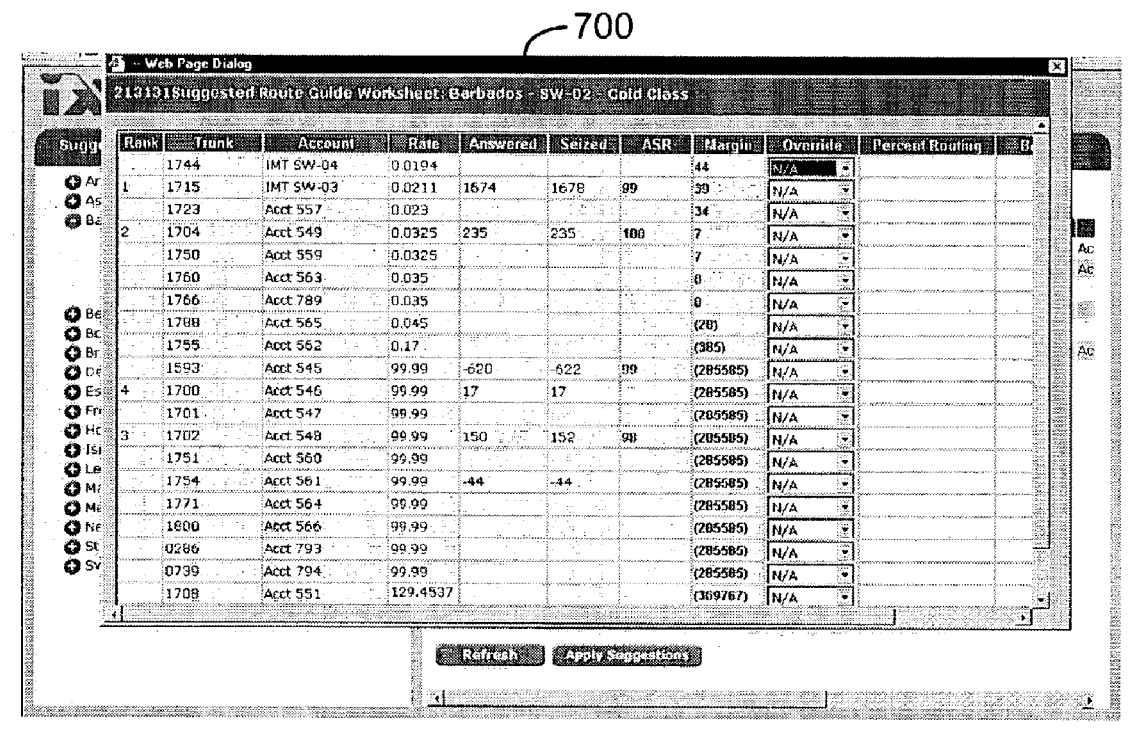

Using a routing method such as the embodiment described above, a network operator can facilitate collaboration between its routing and network provisioning teams, which can deliver the best possible quality of service and the lowest cost. FIGS. 6 and 7 illustrate exemplary graphical user interfaces through which users can view routing data and can view criteria necessary to make routing decisions. The network operator can define quality, margin, and other benchmarks for each switch, service, and destination.

As shown in FIG. 6, screen 600 provides a route guide 602 and a view of actual traffic in inbound traffic table 604 and outbound traffic table 606. Based on the actual traffic, route guide 602 provides recommendations for changing routing, as shown, for example, at line 608.

As shown in FIG. 7, screen 700 provides a suggested route guide worksheet, which lists, for example, rank, trunk, account, rate, answered, seized, ASR, and margin. These figures enable an operator to analyze the factors that impact routing decisions.

Referring again to FIG. 3, controller 302 determines the best routes by combining the operator-defined benchmarks with financial, network, and traffic data for each switch, service, and destination.

After determining the best routes, controller 302 presents the results to the network operator through reports 314 showing existing route guides, route guide changes, and the actual flow of traffic compared to the route guide. Controller 302 also generates new routing schemes 318 and recommends routing options to the network operator. The operator can view the recommendations, review the reasons for the recommendations, and can choose to accept, modify, or reject the routing changes.

Aside from following operator-defined benchmarks in view of financial, network, and traffic data, controller 302 also allows the network operator to override suggested route guides to handle business exceptions and scenarios that fall outside of modeling techniques.

After an operator accepts a routing recommendation, controller 302 can also immediately implement those recommendations in the form of routing instructions, which can be subsequently uploaded to a switch. System 300 controls the switch implementation workflow and interfaces with automated provisioning systems to provide a complete end-to-end solution.

In an embodiment of the present invention, system 300 includes one or more of the following aspects:
  Web-based graphical user interface.
  Users can maintain benchmark information for one or more of:
    Acceptable ASRs by destination and switch
    Acceptable margins by quality of service, destination, and switch
    Quality of service indicators
    Percentage routing
    Exclusion of specific trunks from routing.
  View actual route guide for each switch and service.
  View outbound traffic volume, ASR, and cost information for each route to facilitate route optimization based on cost, quality of service, and capacity.
  View inbound traffic and margin information for each route to facilitate decision-making.

Handle routing exceptions by allowing authorized operators to override the calculated route guide. Exceptions can be defined as:
  Force a carrier into a specific route choice
  Exclude a carrier from one or all route choices
  Apply percent routing by carrier.
Each exception can be assigned to an effective period, or have an indefinite effective period.
Customizable business rule logic to integrate customer specific routing optimization.
Apply workflow rules for all recommended routing instructions. A routing request is tracked by the system and is assigned a valid status:
  Suggested
  Approved
  Rejected
  Issues for implementation
  Implemented
  Cancelled.
Audit all route change.
View routing instructions by order of financial importance.
Receive Alerts when system suggests new routing.

System Architecture

Figure 8:
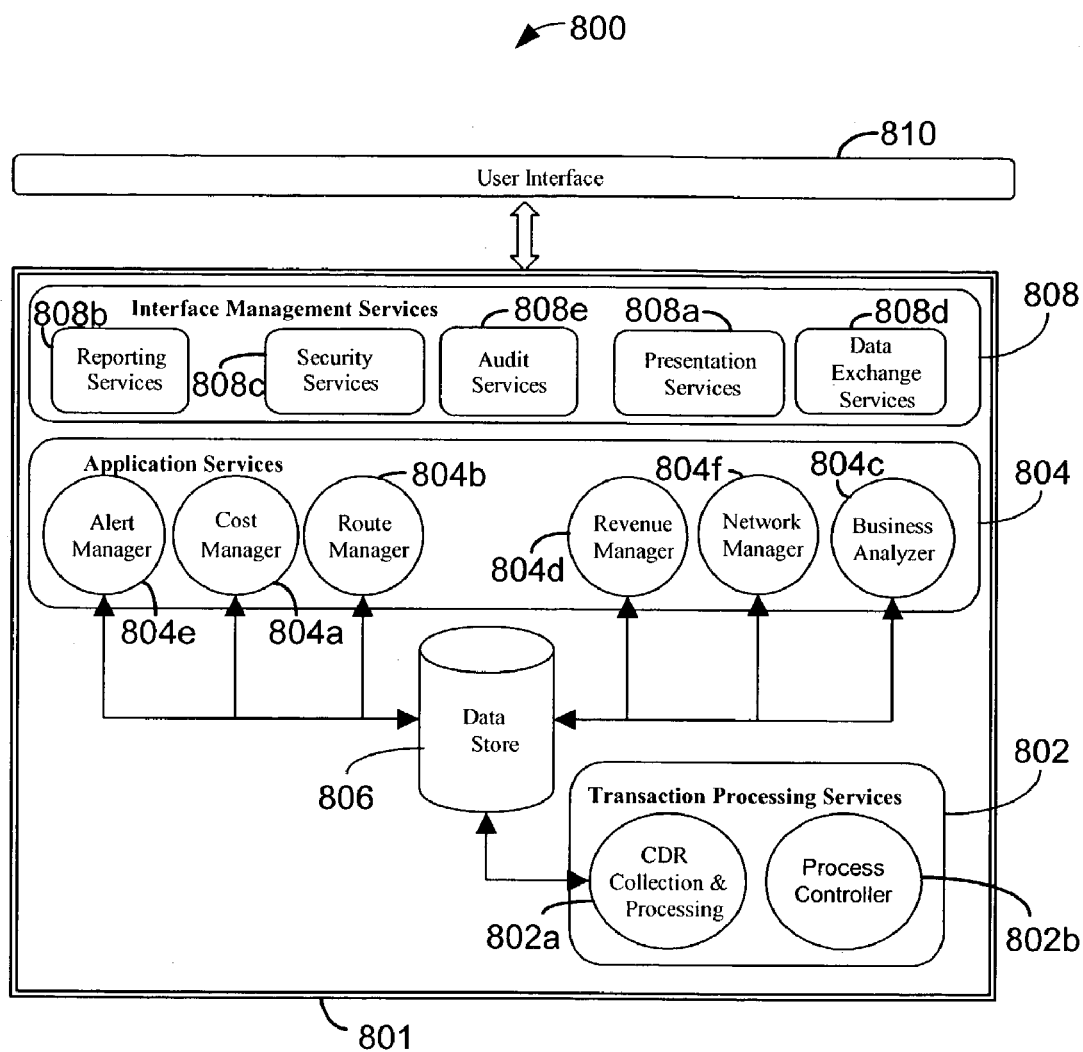
FIG. 8 is a schematic diagram that illustrates an exemplary system for managing interconnect traffic, according to an embodiment of the present invention.

FIG. 8 illustrates a system 800 for implementing a method for managing interconnect traffic, according to an embodiment of the present invention. As shown, system 800 includes an application 801 in communication with a user (e.g., network operator) through user interface 810. Application 801 includes a set of modular components, with four distinct layers: transaction processing services 802, application services 804, data store 806, and interface management services 808. This modular design provides flexibility, scalability, and ease in expanding system functionality. The following sections describe these exemplary modular components in more detail.

A. Transaction Processing Services (CDR Processing)

Transaction processing services 802 manage the collection and processing of raw call detail records or summary CDR records from external systems such as mediation devices. Data is collected, validated, checked for errors, and subsequently rated (both on the revenue and cost side). Transaction processing service 802 also analyze the processed data to create summary information for traffic usage, costs, and revenues. The data is posted to data store 806 for access, analysis, and reporting by users.

Figure 9:
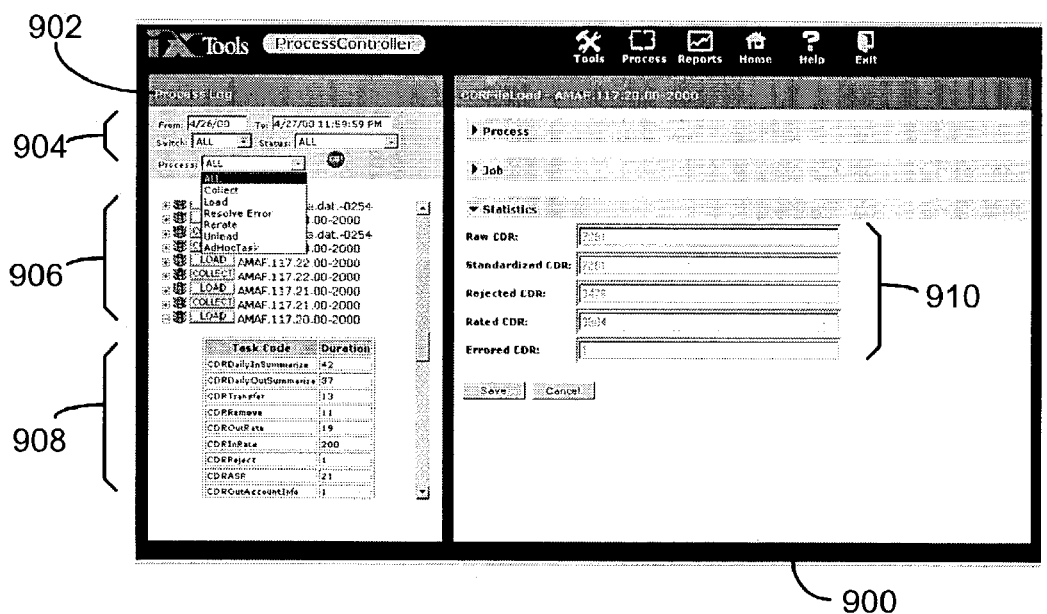
FIG. 9 is a screen image of an exemplary graphical user interface through which a user manages and monitors transaction processing tasks, according to an embodiment of the present invention.

FIG. 9 illustrates an exemplary graphical user interface through which a user manages and monitors transaction processing tasks. As shown, screen 900 provides a process log 902, which includes data selection filters 904, task status indicators 906, and detailed task steps 908. Screen 900 also provides detailed task statistics 910.

In an embodiment of the present invention, additional services are also available for reprocessing of data that has already been processed, or data records that have been rejected. For example, it is possible to re-rate CDRs to correct for errors in rates.

As shown in FIG. 8, an embodiment of transaction processing services 802 includes a process controller 802a and CDR collection and processing 802b. An exemplary process controller 802a has one or more of the following features and functionalities:
  CDR collection and processing steps can be scheduled as automated tasks.
  Tasks can be scheduled for future execution.
  Users can view the progress and status of each task.
  Users can change task priorities and stop or delay task executions.
  The user interface is web-based and easy to use.
  Alerts are generated to notify system operator of process status.
  A full audit of records read, processed, rejected, etc., by switch and date is available.
  Tasks can run in parallel, e.g., multiple rating tasks for different switches can run simultaneously.

An exemplary CDR collection and processing 802b has one or more of the following features and functionalities:
  System can be customized to work with any CDR format input.
  CDR data can be collected from unlimited number of switches.
  System can be customized to use different mechanisms for fetching CDR data, e.g., FTP, ODBC, DOS Copy, and ZIP & UNZIP.
  Uses reference data in SQL database to process, rate (price and cost) the CDRs.
  CDR records that lack sufficient processing data are placed in a suspense table, which can be fully analyzed and viewed.
  CDRs for completed calls, incomplete calls, and inter-machine trunks can be processed or excluded as required and defined by dynamic business rules.
  While the business logic can be customized to look at different CDR elements, the following are the typical parameters that are analyzed:
    Switch ID
    Sequence Num
    Inbound Trunk Number
    Inbound Trunk Member
    Out Trunk Number
    Out Trunk Member
    Calling Number (A Number)
    Called Number (B Number)
    Call Date
    Call Time
    Call Duration
    Connect Time
    Answer Time
    Hold Time
    Disconnect Time In an aspect of the present invention, transaction processing services 802 provide rating and costing processes that support calculations using foreign currency and exchange rate data.

In another aspect of the present invention, transaction processing services 802 provide a rating and costing engine that contain customizable business rules where different rating methods can be plugged-in.

In another aspect of the present invention, transaction processing services 802 provide advanced re-rating capabilities in the rating engine, which allows for a quick re-calculation of revenues and costs when interconnect partners supply retroactive price changes.

B. Application Services

An embodiment of the present invention uses software modules that data mine already existing network traffic information in order to determine optimization from a financial, sales, and network perspective. In this embodiment, the modules include: 1) CostManager 804a; 2) Route- Manager 804*b;* 3) BusinessAnalyzer 804*c;* 4) RevenueManager 804*d;* 5) AlertManager 804*e;* and 6) NetManager 804*f.*

These software modules correspond to services that are divided into discreet functional areas: Cost Management; Route Management; Revenue Management; Business Analysis; Network Management; and Alert Management. The following sections describe these functions and modules in more detail.

1. Cost Management

Figure 10:
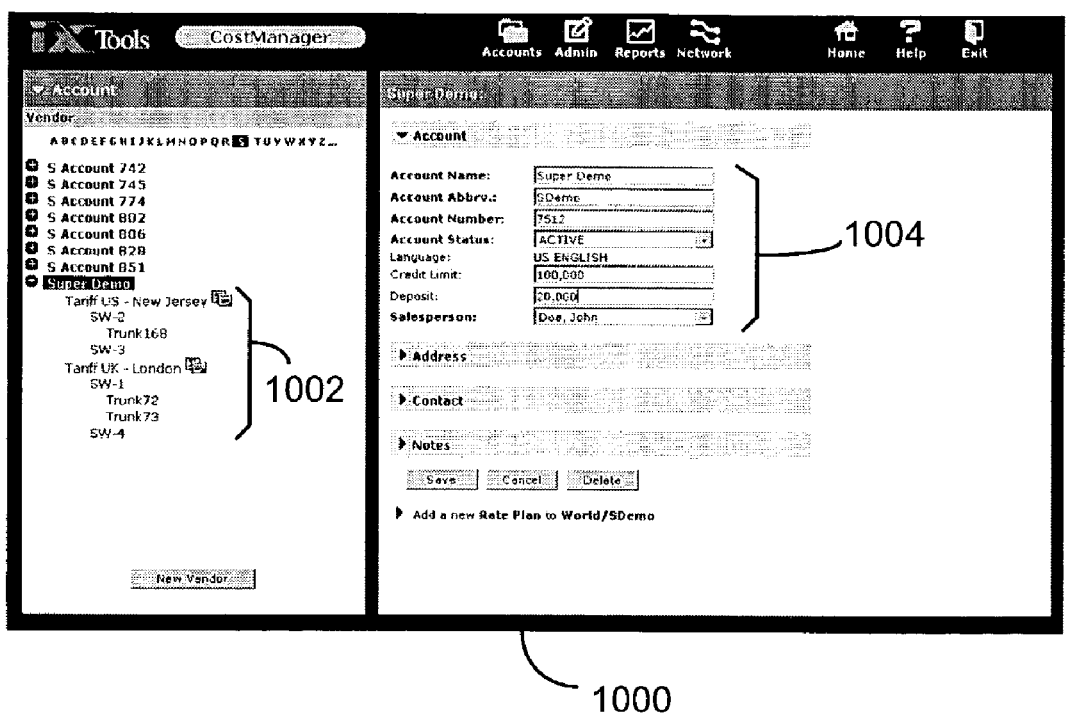
FIG. 10 is a screen image of an exemplary graphical user interface through which a user maintains a vendor profile, according to an embodiment of the present invention.
Figure 11:
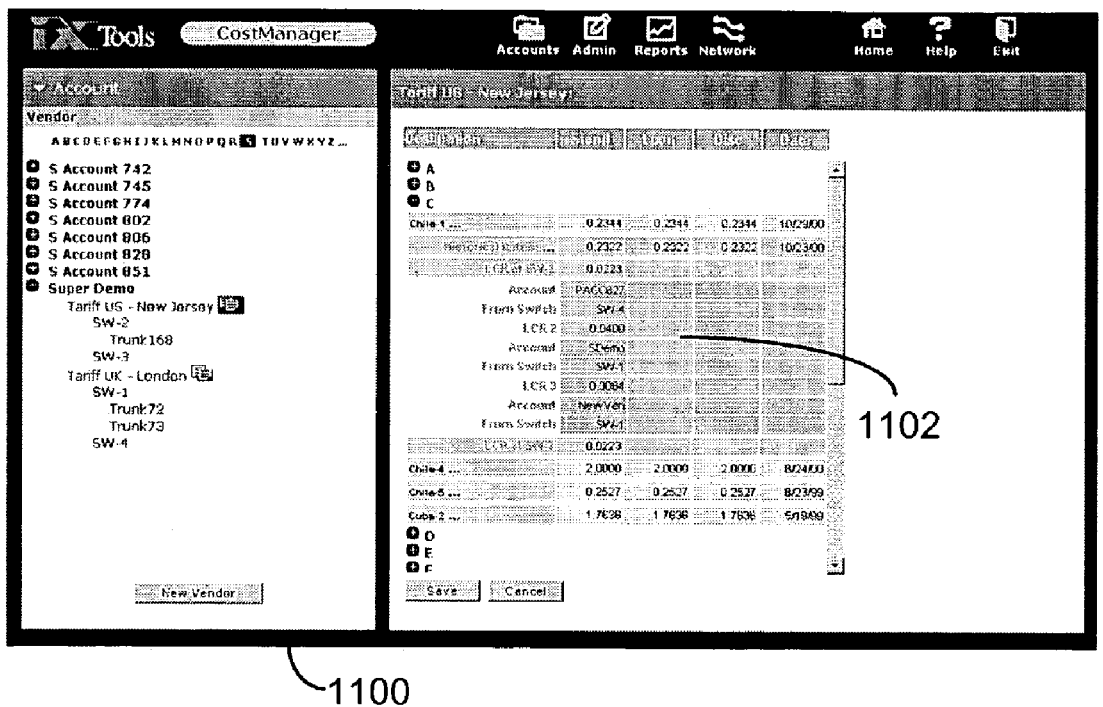
FIG. 11 is a screen image of an exemplary graphical user interface through which a user manages rates, according to an embodiment of the present invention.

CostManager 804*a* helps in managing the cost of sales and in optimizing the least-cost routing strategy. Users can maintain vendor account information, interconnection agreement details, and cost information by destination. FIGS. 10 and 11 illustrate exemplary graphical user interfaces through which a user maintains a vendor profile and manages rates, respectively.

As shown in FIG. 10, screen 1000 provides the account hierarchy 1002 of a vendor, organized by tariff, switch, and trunk. In addition, screen 1000 provides the account information 1004 corresponding to the vendor, such as account name, account number, account status, credit limit, deposit, and salesperson.

As shown in FIG. 11, screen 1100 provides a tariff view that lists the vendor's standard, economy, and discount rates by destination. The table facilitates rate management and provides a least cost route view 1102.

CostManager 804*a* generates least cost route (LCR) guides using stored vendor information. In calculating the LCR, CostManager 804*a* incorporates factors such as cost per minute, transport costs, currency, and quality of service.

Through CostManager 804*a*, users maintain the rate tables, which are used by transaction processing services 802 to process CDRs and cost calls. Users can maintain current rates, enter rates that will become effective in the future, and view historical rates.

CostManager 804*a* reporting functions provide a detailed and summary view of the outbound traffic and transform raw transactional information into business intelligence focusing on minutes, costs, traffic destinations, traffic trends, and variances for the entire network and interconnect base.

CostManager 804*a* also provides reports comparing actual costs to the least-cost route guide and highlights the opportunity cost of incorrect routing or inadequate capacity. In addition, many reports are available to generate and compare route guides by date and quality of service.

In an embodiment of the present invention, CostManager 804*a* includes one or more of the following features and functionalities:

Assign multiple rate plans to an account.
Web-based graphical user interface.
Maintain vendor information: Profile
    Address
    Contact
    Notes
Assign multiple rate plans to an account.
Assign a rate plan to one or multiple switches. This feature provides support for multi-switch network operators.
Rate information can be entered in any currency.
Assign an effective start date to every rate/destination combination.
Stores historical, current, and future rates, making re-rating and dispute resolution simple.
Users can maintain a service quality indicator for each vendor, switch, and destination combination.

Define trunk information for each point of interconnection by switch.
Generate least cost route guides by switch and class of service.
Compare LCRs for different days.
View real-time traffic and cost data for:
    Outbound cost information
    Outbound routing information
    Outbound overflow identification
    Least Cost versus actual cost comparison
Create ad-hoc reports using user-selectable 'group by' and 'sort by' selection criteria.
Export report data to Excel and Word.

2. Route Management

RouteManager 804*b* uses the information maintained through CostManager 804*a* to provide advance route optimization support.

RouteManager 804*b* helps facilitate collaboration between routing and network provisioning teams to deliver the best possible route quality at the lowest cost. Users can define quality, margin, and other benchmarks for each switch, service, and destination. The routing optimization of RouteManager 804*b* combines the user-defined benchmarks with financial and network data to determine the best routes.

In an aspect of the present invention, RouteManager 804*b* also allows users to override the suggested route guide to handle business exceptions and scenarios that are beyond modeling.

In another aspect of the present invention, RouteManager 804*b* brings all of the available financial, network, and traffic data for each switch, service, and destination into a common user interface to streamline the route selection process. FIGS. 6 and 7 illustrate exemplary graphical user interfaces through which users can view routing data and can view criteria necessary to make routing decisions.

The reports of RouteManager 804*b* show existing route guides, route guide changes, and the actual flow of traffic compared to the route guide.

In another aspect of the present invention, RouteManager 804*b* generates new routing schemes and makes recommendations. Users can view the suggestions, review why the suggestions were made, and decide to approve, modify, or accept the routing changes. RouteManager 804*b* can be customized to create routing instructions, which can be subsequently uploaded to the switch.

In another aspect of the present invention, RouteManager 804*b* controls the switch implementation workflow and can interface with automated provisioning systems to provide a complete end-to-end solution.

In an embodiment of the present invention, RouteManager 804*b* includes one or more of the following features and functionalities:

Web-based graphical user interface
Users can maintain benchmark information for:
    Acceptable answer to seize ratios (ASRs) by destination and switch
    Acceptable margins by quality of service, destination, and switch
    Quality of service indicators
    Percentage routing
    Exclusion of specific trunks from routing
View actual route guide for each switch and service.
View outbound traffic volume, ASR, and cost information for each route to facilitate route optimization based on cost, quality of service, capacity.
View inbound traffic and margin information for each route to facilitate decision-making.

Handle routing exceptions by allowing authorized operators to override the calculated route guide. Exceptions can defined as:
  Force a carrier into a specific route choice
  Exclude a carrier from one or all route choices
  Apply percent routing by carrier
Each exception can be assigned to an effective period, or have an indefinite effective period.
Customizable business rule logic to integrate customer specific routing optimization algorithm.
Apply workflow rules for all recommended routing instructions. A routing request is tracked by the system and is assigned a valid status:
  Suggested
  Approved
  Rejected
  Issues for implementation
  Implemented
  Cancelled
Audit all route change
View routing instructions by order of financial importance
Receive Alerts when RouteManager suggest new routing.

3. Revenue Management

RevenueManager 804*d* is designed to monitor and track inbound traffic, and to optimize revenue potential. Users can maintain accounts, rates, and interconnection details (trunk information), and can generate reports for evaluating the sales, inbound traffic, and sales operation.

Figure 12:
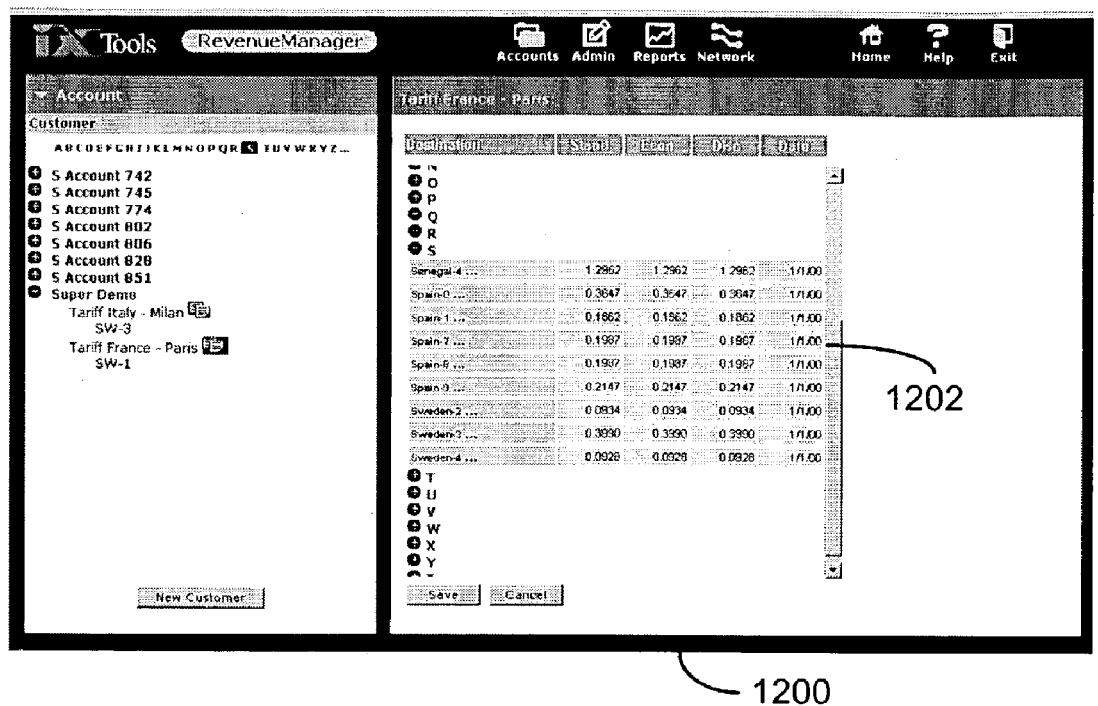
FIG. 12 is a screen image of an exemplary graphical user interface through which a user manages customer profiles, according to an embodiment of the present invention.

FIG. 12 illustrates an exemplary graphical user interface through which a user manages customer profiles. As shown, screen 1200 provides a table 1202 that can be used to manage sell rates.

Transaction processing services 802 use the rate tables maintained by RevenueManager 804*d* to process CDRs and rate calls. Users can maintain current rates, future rates, and historical rates.

RevenueManager 804*d* provides a detailed and summary view of the inbound traffic and transforms raw transactional information into business intelligence focusing on minutes, revenues, traffic destinations, traffic trends, and variances for the entire network and customer base.

In an embodiment of the present invention, RevenueManager 804*d* includes one or more of the following features and functionalities:
  Web-based graphical user interface.
  Maintain Customer information:
    Profile
    Address
    Contact
    Notes
  Assign multiple rate plans to an account.
  Assign a rate plan to one or multiple switches. This feature provides support for multi-switch network operators.
  Rate information can be entered in any currency.
  Assign an effective start date to every rate/destination combination.
  Stores historical, current, and future rate, making re-rating and dispute resolution simple.
  Define trunk information for each point of interconnection by switch.
  View real-time traffic and cost data for:
    Inbound revenue information
    Inbound routing information
    Inbound overflow identification
  Create ad-hoc reports using user-selectable 'group by' and 'sort by' selection criteria.
  Perform credit control and financial position of the Customer.
  Export report data to Excel and Word.

4. Business Analysis

BusinessAnalyzer 804*c* includes a set of customizable business rules and reports to help with the management of key performance indicators, the identification of trading opportunities, and the analysis of what-if situations. BusinessAnalyzer 804*c* can work with data inputs from RevenueManager 804*d* and CostManager 804*a*, or data from existing corporate revenue and cost accounting systems. FIG. 13 illustrates an exemplary graphical user interface presenting a breakeven analysis.

In an embodiment of the present invention, BusinessAnalyzer 804*c* includes one or more of the following features and functionalities:
  Intelligent reports that provide:
    Breakeven analysis
    Margin analysis based on planned routing. The report uses the selling price and calculates the expected margin based on the termination cost for the first five least cost routes.
    Margin analysis based on actual routing. Reports on profit margin using the actual revenues and costs obtained from the traffic data. The summarization and sorting options provides seven dimensions for viewing the information, e.g. by date, account, destination, etc.
    Target buy rates. Helps to establish new minimum purchase rates for each destination based on the least cost rates in order to set better targets and reduce costs.
    Target sells rates. Helps to establish minimum selling rates for each destination based on the calculated breakeven rates and desired margin.
    Unrealized profit due to sub-optimum routing. Identified the additional cost that is incurred as a result of the traffic termination to carriers not in the least cost. The report shows the potential margin that is lost, as traffic is not terminated on the first routing choice. The summarization and sorting options provides seven dimensions for viewing the information, e.g. by date, account, destination, etc.
  The reports use formulas to accommodate actual variable termination cost, variable overhead (VO) cost, and fixed overhead (FO) cost.
  Customizable business rules for calculating:
    Breakeven rates
    Target buy rates
    Target sell rates 5. Network Management NetworkManager 804*f* provides not only the essential traffic, capacity, utilization, and answer-to-seize ratio (ASR) reporting that is needed to manage network operations, but also the account-level information needed to manage interconnect relations.

In an aspect of the present invention, NetworkManager 804*f* analyzes CDR data to provide hourly, daily, and monthly reports for all switches and trunks and shows the inbound and outbound billable and non-billable minutes of usage for each trunk.

In another aspect of the present invention, NetworkManager 804*f* facilitates planning for trunk capacity changes by comparing capacity with actual traffic usage over time.

In another aspect of the present invention, NetworkManager 804*f* uses ASR calculations to show the quality of service on an hourly, daily, and monthly basis for all destinations, switches, and inbound and outbound trunks. It provides analytical capabilities to pinpoint lapses in quality, the customers affected by such lapses, and the vendors that have caused them.

Figure 14:
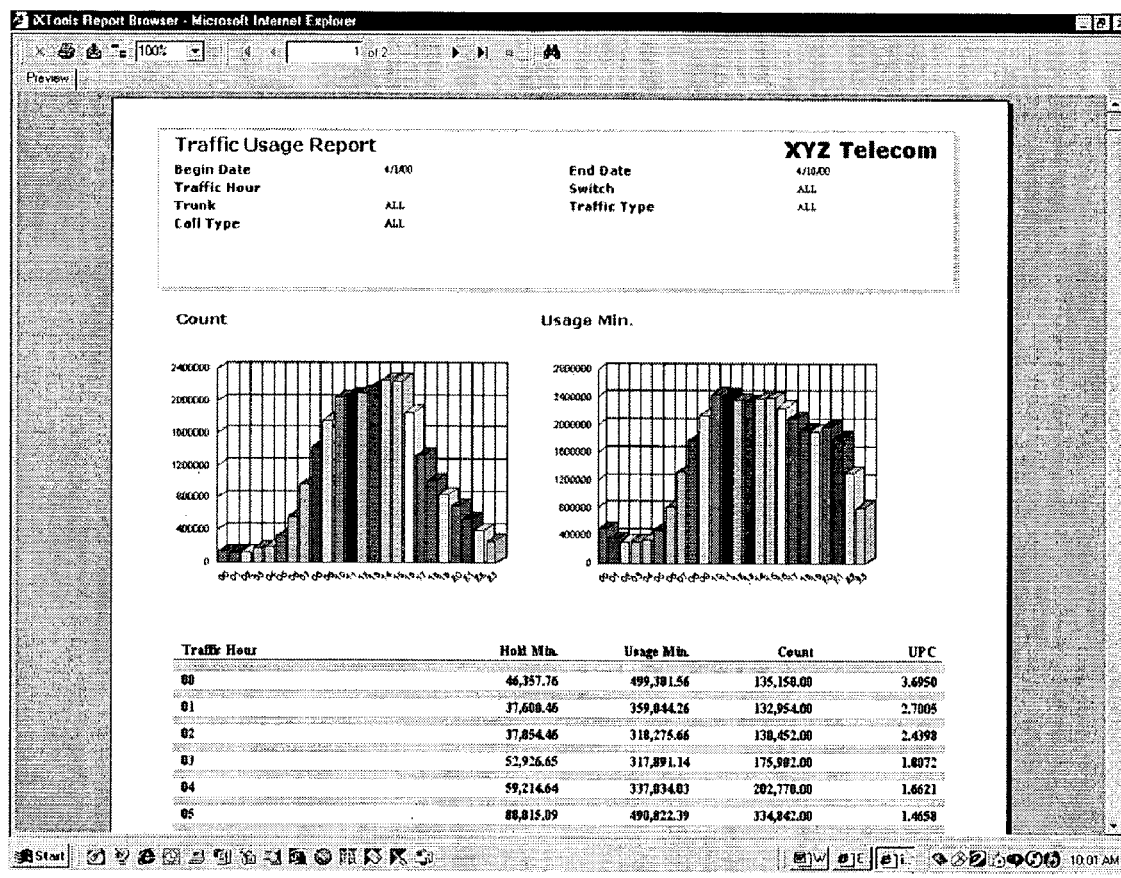
FIG. 14 is a screen image of an exemplary graphical user interface presenting a busy hour report, according to an embodiment of the present invention.
Figure 15:
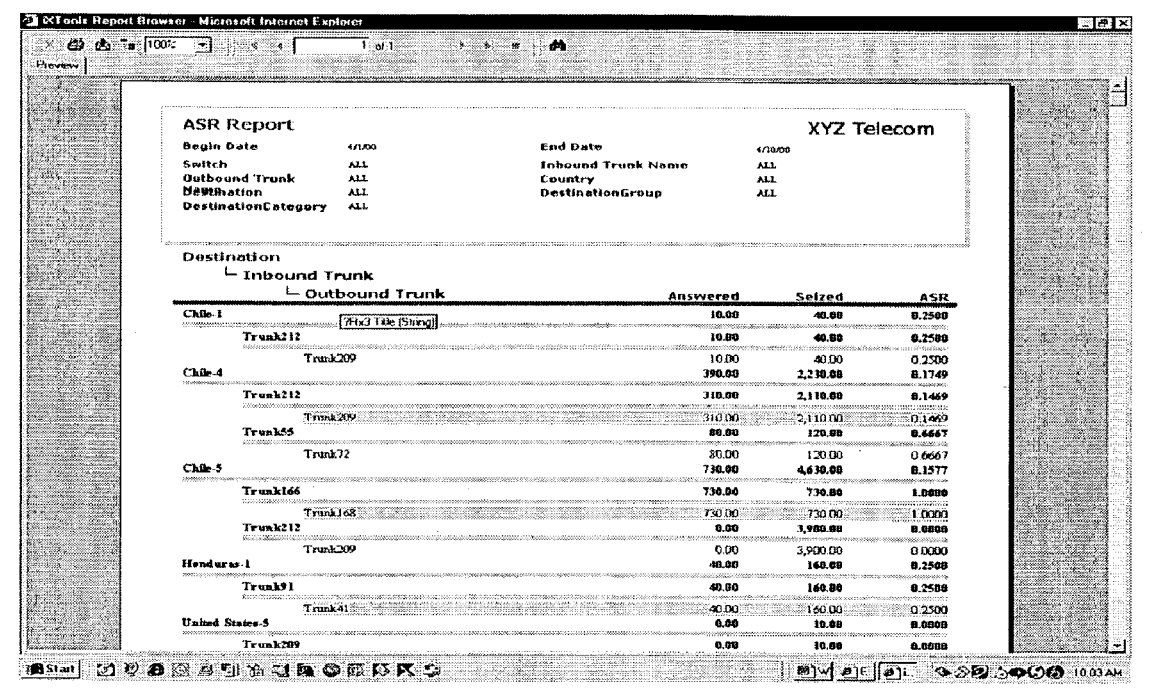

FIG. 14 illustrates an exemplary graphical user interface presenting a busy hour report. FIG. 15 illustrates an exemplary graphical user interface presenting a destination ASR report with inbound and outbound trunk information.

In an embodiment of the present invention, NetworkManager 804f includes one or more of the following features and functionalities:
Maintain trunk information:
Number of available ports
Number of active ports
Target usage (minutes of usage) by port
Track historical information as trunk capacity information changes
Monitor network performance through intelligent reports:
Monitor actual trunk traffic versus target usage
Identify bandwidth and capacity shortage problems
Monitor trunk traffic activity by traffic type, i.e., inbound, and outbound
Monitor traffic volumes by date & time of day—'busy hour' reports
View ASR by destination, inbound and outbound trunk
Identify traffic overflow problems 6. Alert Management AlertManager 804e quickly notifies a business of business conditions that require immediate attention.

In an aspect of the present invention, AlertManager 804e notifies staff of pre-defined events using email or mobile phone paging. AlertManager 804e works with all other modules.

In another aspect of the present invention, AlertManager 804e monitors the data input from users and data from actual traffic information. When AlertManager intelligence detects that certain specific conditions have been met, it generates an alert. For example, a 10% drop in traffic volume over a one hour time period may be a condition that requires investigation by the network engineers.

In another aspect of the present invention, AlertManager 804e is configured to trap these conditions and forward relevant information to the appropriate staff.

Figure 16:
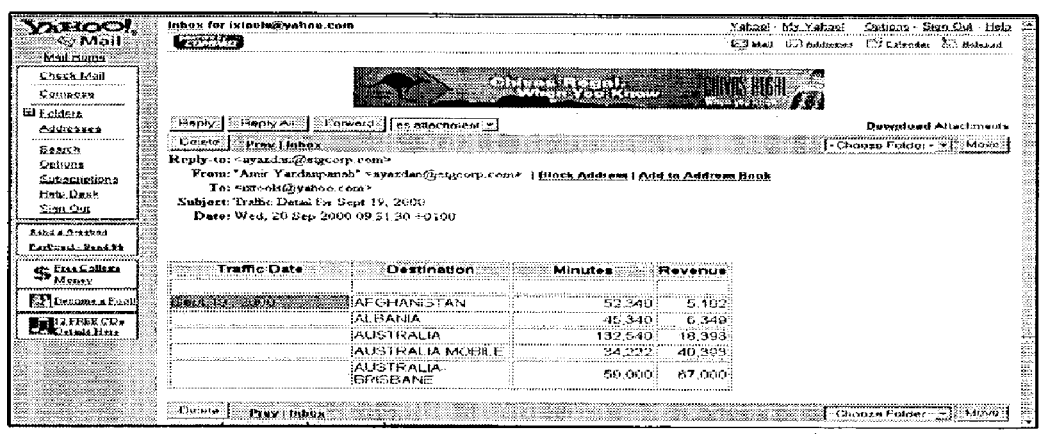
FIG. 16 is a screen image of an exemplary email alert, according to an embodiment of the present invention.

FIG. 16 illustrates an exemplary email alert that includes a traffic summary.

In an embodiment of the present invention, AlertManager 804e includes one or more of the following features and functionalities:
Alert can be sent to one or multiple recipients.
Alert message can be sent to any device that can be reached through email compliant addressing, i.e. xxxxxxxxx@yyyyyy.com. This includes email accounts, mobile phones, and pagers.
AlertManager sends its notification through MAPI, SMTP, or POP3 compliant email systems.
Alert messages can include many type of data:
Simple text
With attachment such as Word or Excel files
HTML
Alerts are completely customizable. Users will define the business rules that should trigger an alert message.
Alert can be used as a mechanism to send summary reports to appropriate users on a scheduled basis.

C. Data Store

According to an embodiment of the present invention, data store 806 is one or more relational database tables based, for example, on Microsoft SQL Server 2000™. Data store 806 can be logically broken into several groups.
Usage Data Mart
Rated CDRs—detail records or aggregated data
ASR summary
Trunk usage summary
Outbound usage summary
Customer and Vendor Data
Vendor agreement data
Customer agreement data
Routing instructions
Rules Data
Reference and business rule data The Usage Data Mart holds a large number of records. The database tables are designed for performance and flexibility. The CDR information is stored in partitioned tables, which provide an optimum mechanism for adding, deleting, and updating of information. In addition, the partition table approach allows for simplified backup and restoring of monthly CDR data.

The Usage Data Mart holds the detail and summary traffic information, which has been processed, rated, and aggregated. The reporting system is mostly generated by querying this pre-aggregated data. This allows for faster report generation with little impact on other system processes.

According to an embodiment of the present invention, features of the Usage Data Mart include one or more of:
Data is stored in partitioned tables.
The data tables are distributed and stored in several physical databases.
Depending on CDR volumes, the Usage Data Mart can be stored on one or multiple servers.
When the Usage Data Mart is stored on multiple servers, SQL Server's remote access procedures are used to access data seamlessly.

The Customer & Vendor Data holds the customer and vendor information for:
Profile
Address
Contact
Notes
Interconnect points
Switches
Trunk connection detail
Destination, selling prices, buying prices For the Customer & Vendor Data, all data entities are date and time stamped. The system keeps track of changes and logs the modifications as required. Historical information for rate changes is kept on-line and can be archived at the user request.

According to an embodiment of the present invention, features of the Customer & Vendor Data include one or more of:
Data is stored in relational database tables.
External systems can be granted direct read access to the data using ODBC or ADO connectivity.
Data can be imported or exported to external system.

The Reference & Business Rules data store holds the key to the correct operation and configuration of the system. The database includes items necessary for the correct processing of CDRs, such as a Destination List and Dialing plan.

There are two types of reference data; (1) those that are maintained by the user, and (2) those that are maintained by the system operator (normally set at the time of system configuration).

The table-driven approach to system configuration provides the ability to quickly respond to user change requests.

The application can be easily modified to incorporate new requirements without complicated code changes. This design approach reduces the software maintenance.

D. Interface Management Services

System 800 is designed based on a thin client multi-tier architecture. The Interface Management layer 808 includes the following services: Presentation 808a; Reporting 808b; Security 808c; Data exchange 808d; Audit 808e; and Email 808f. This design provides accessibility, flexibility, and scalability. Application 801 can be made available to anybody with access to a global computer network (e.g., the Internet), as is represented by user interface 810. Application modifications and deployment are manageable. System 800 can continue to grow by adding more servers as the number of users and the transaction records increase.

1. Presentation Services

According to an embodiment of the present invention, presentation services 808a enables users to interact with application 801 primarily through a web browser. The application is preferably delivered to the users mostly as dynamic HTML and XML text. The users also receive a few small components that run on the client machine. These components are designed to manage some basic tasks such as parsing and validation. The user services consist of two components: user interface and reporting.

By using the rich graphical capabilities of HTML, the present invention provides an intuitive and appealing GUI. In an aspect of the present invention, considerable attention is given to the concept of "information on demand." The interface only provides the users with the data that they need at the time they need it. The result is an application that is fast and responsive, even when the users are connected through telephone lines.

The user interface component controls users' access to various functions that are available. Through this interface, the users can view, edit, and add new information depending on their privileges.

2. Reporting Services

The present invention provides reporting functions 804b that help users analyze the vast amount of data associated with interconnect management. The reports are delivered to the browser using, for example, industry standard Crystal Reports™ viewers. Users can print or save each report locally in different file formats such as Microsoft Excel™ and Word™.

Two groups of reports are offered by the present invention. The first group of reports consists of fixed format reports that address specific business issues. For example, the route guide report has a fixed structure, and the users can specify their report criteria such as date, switch, etc. The second group of reports consists of dynamic OLAP-style reports that allow the users to control the structure of the report in addition to specifying the report criteria. For example, for the inbound traffic report, the user can decide to view the traffic by date, destination, and account or other combinations of about twelve dimensions that are supported for that report.

3. Security Services

Security services 808c handle sensitive financial information that must be protected and include one or more of the following:

Network Access Restriction—Network access restriction is the point at which the security model begins. The required access control depends on the type of deployment.

Intranet—When deploying in a corporate Intranet, a user can rely on the corporate firewall and other corporate security measures to prevent external access.

Extranet—If hosted on an Extranet environment, then access lists, Virtual Private Network (VPN) tools, or other restrictive technologies can be used to limit network access to select groups of users.

Internet—When deployed on the Internet and accessible by all users, then firewalls can be used to monitor the users and restrict their access to HTTP and FTP services.

Data Encryption—Encryption can be implemented at three levels. With Virtual Private Networks, the entire communication channel between clients and application 801 can be encrypted. When necessary, HTTPS can be used to encrypt the content of any HTTP session. At the application level, application 801 can encrypt passwords and any other fields with sensitive data.

Application Access Restriction—Even with network access available, the users are required to provide valid user names and passwords in order to gain access to application 801. An audit log of user log-in and log-out is maintained.

Application Security Model—Once the users are in application 801, their ability to perform various tasks is managed by the application 801 security model. In this model, the users belong to different roles, and each role has certain rights. For example, user "jdoe" may belong to role "Sales" and may have the right to "View revenue reports" but not have the right to "Add new destinations." The model also supports workflows by knowing the state of the workflow object and applying rights according to that state. For example, the role "Sales" may have the right "Modify trade offer" before the offer is submitted for review but not after. Extensive auditing capabilities are available in application 801. If necessary, all data entry records can be logged indicating the user that performed the entry with a timestamps.

4. Data Exchange Services

The design exchange services 808d of application 801 provide an open system that interface with users and external systems through the following exemplary interfaces.

HTTP is the standard protocol used by browsers to communicate with web servers. Due to its prevailing nature and its ability to go through proxies and firewalls, HTTP is also becoming popular as an application-to-application communication protocol.

HTTPS is the same as HTTP but with the added benefit of security through encryption. The performance is slower and it is usually used when sensitive information is transmitted over the Internet.

FTP allows application 801 to receive or send files to other machines. CDR files are generally obtained using FTP.

ODBC and OLE DB are database and data connectivity protocols that allow application 801 to interface with any other system that supports these data connectivity protocols.

XML is a markup language that is mostly used for blending the content and description of data. Application 801 can send and receive XML files to any system that supports this technology.

SMTP, POP3, and MAPI are email protocols that enable application 801 to actively alert and inform its users via email and to receive email messages from the users and other systems.

5. Audit Services

The audit services 808e of application 801 provide the ability to audit and log all user interactions with the system. Two types of activities are logged: (1) functional, and (2) data.

1. Functional activities occur when the user performs tasks such as adding an account and running a report. The application tracks user activities and creates audit record in the database. This audit log can be viewed using the 'System Activity' reports.

2. Data activities are when, as a result of functional activity, the content of records in the database tables changes. These data level activities are tracked using the SQL Server facilities. Triggers are put in place to log any data change (add, change, delete). The before and after images of the data records are stored in the Audit database.

Auditing and logging of functional and data activities are turned-on during configuration at the user request.

Exemplary Component Specifications

Figure 17:
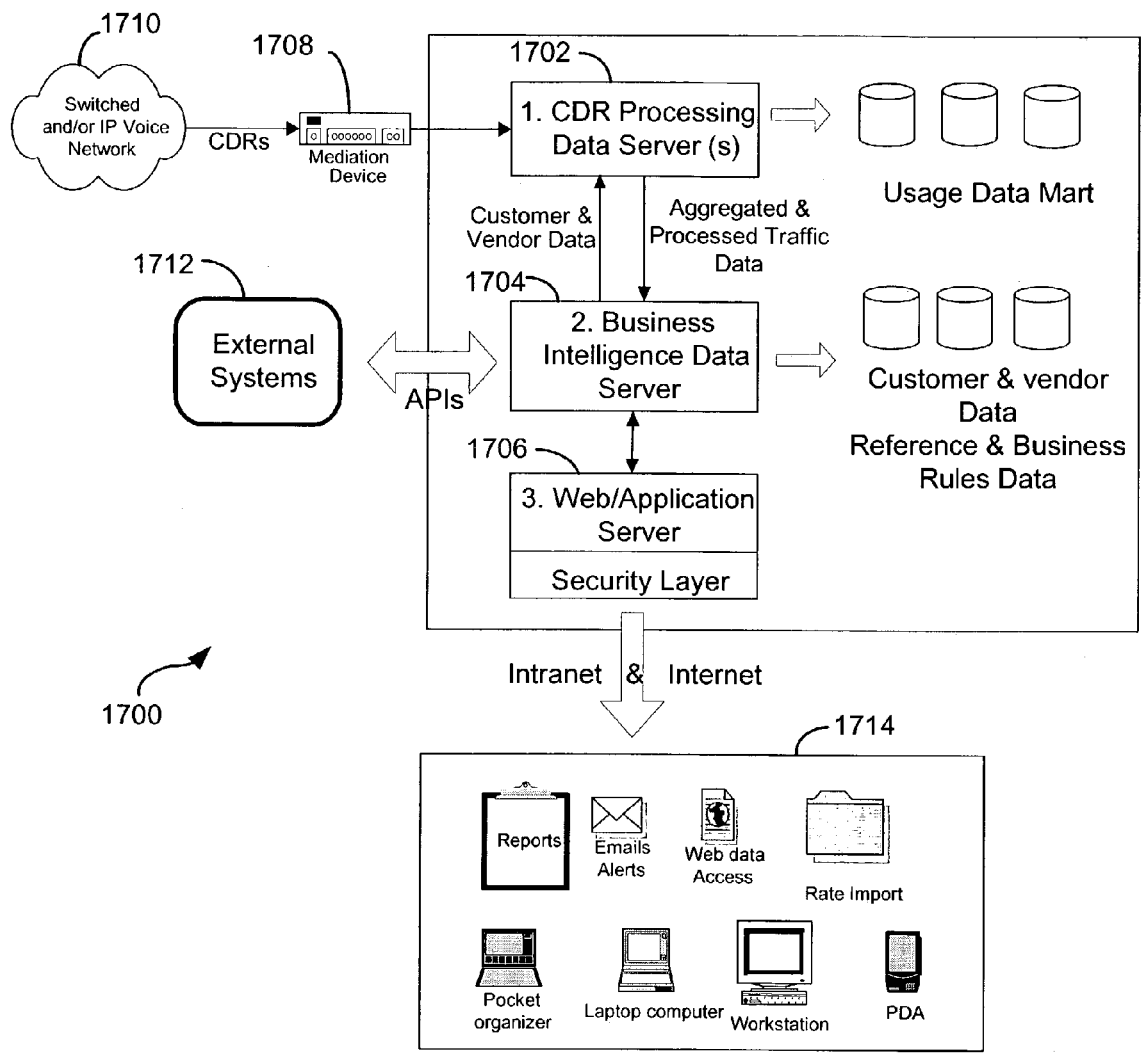
FIG. 17 is a schematic diagram of an exemplary system architecture, according to an embodiment of the present invention.

According to an embodiment of the present invention, application 801 is implemented on an open architecture based on proven XML, Web, object oriented, and relational database technologies. The modules of application 801 are flexible, scalable, and easily deployable. They are designed to provide the user with an intuitive and simple-to-use interface. FIG. 17 reflects an exemplary architecture 1700 of the system, which consists of the following components: CDR processing data server(s) 1702; business intelligence data server 1704; and web/application server 1706.

CDR Processing Data Server(s)

This component is responsible for collecting and processing high volumes of call transactions. CDR processing data server 1702 collects CDR data from the mediation platforms 1708 on an automatic and scheduled basis. The CDR data is received from, for example, a switched and/or voice network 1710. The raw CDR data is parsed, standardized, rated, costed, and loaded into the relational database. CDR processing data server 1702 interacts with business intelligence data server 1704 to request information necessary for processing a call, and post aggregate information into the business intelligence data server 1704. Depending on CDR volumes, there may be a need to have more than one CDR processing server. The design of architecture 1700 allows the configuration of a number of servers (unlimited) to work together as a cluster and process high volume CDR information. This architecture provides on-demand scalability.

Depending on CDR volumes, storage requirements, number of users, the following is an exemplary hardware configuration of CDR processing data server 1702:

Specification:
Dual CPU Pentium III 933 or better with expansion capability to four CPUs
2×18 GB RAID 1
4×36 GB RAID 5
Disk Controller dual channel for RAID with=>64M of I/O Cache
512 RAM memory
Network interface card
Third party software:
Windows 2000 server with service pack 1
SQL Server 2000
PC Anywhere version 9.2
Business Intelligence Data Server Business intelligence data server 1704 uses relational database engine and application software to handle the data-intensive parts of application 801. The server software holds key information such as customer, vendor, and traffic information. In addition, business intelligence data server 1704 includes analysis-ready data-marts to hold aggregate information on, for example, costs, revenues, traffic trends, bandwidth usage, and routing information. Business intelligence data server 1704 receives its information from CDR processing server 1702. As shown, business intelligence data server 1704 also interfaces with external systems 1712 using application program interfaces (APIs).

Depending on CDR volumes and the number of users, the following is an exemplary hardware configuration of business intelligence data server 1704:

Specification:
Dual CPU Pentium III 933 or better with expansion capability to four CPUs
2×18 GB RAID 1
4×36 GB RAID 5
Disk Controller dual channel for RAID with=>64M of I/O Cache
512G RAM memory
Network interface card
Third party software:
Windows 2000 server with service pack 1
SQL Server 2000
PC Anywhere version 9.2
Web/Application Server Application server 1706 is a collection of business rules and application logic that provides a secured connection and access between a user 1714 and the database information. It also includes a web server, which receives requests from and sends responses to user 1714. As shown, application server 1706 interacts with user 1714 through, for example, reports, email alerts, web data access, rate imports, pocket organizers, laptop computers, workstations, or personal digital assistants (PDAs). Application server 1706 interacts with business intelligence data server 1704 to read and write data as a response to the user requests. Application server 1706 can be implemented either with local access (Intranet) or with remote access (Internet or dial-up connection). An exemplary implementation of application server 1706 consists of Microsoft Internet Information Server™, XML, Active Server Pages, and application code such as Java™ script and VB™ script.

Depending on CDR volumes and the number of users, the following is an exemplary hardware configuration of application server 1706:

Specification:
Single CPU Pentium PIII 933 or better (with possibility to upgrade 2 CPUs)
2×9 GB RAID 1
512G RAM memory
Disk Controller for RAID with=>64M of I/O Cache
Network interface card
Third party software:
Windows 2000 server with Service Pack 1, plus MDAC 2.6
Option Pack 4.0 with IIS 4.0
PC Anywhere (version 9.2)
Seagate Crystal Report (developer edition Version 8.0)

From the foregoing, one of ordinary skill in the art would appreciate that the present invention provides one or more of the following features and benefits:

Processes call detail records;
Manages sales and revenues;
Monitors termination costs;
Controls network routing;

Creates and maintains least cost routing;
Administers interconnecting customers/vendors;
Establishes Quality of Service (QoS) routing;
Tracks and plans trunk capacity usage;
Analyzes margins by termination and service;
Streamlines the sales force activities;
Settles billing disputes;
Bills a network operator's interconnect customers;
Alerts of system exceptions through e-mail or pager; and
Supports multi-switch and multi-currencies.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for managing a carrier's interconnect traffic across a telecommunications network comprising:
   receiving cost and routing rules from the carrier;
   gathering performance data corresponding to the interconnect traffic;
   applying the cost and routing rules to the performance data to determine a first impact on the interconnect traffic;
   receiving superseding routing rules from the carrier;
   automatically calculating proposed changes in network routing based on the superseding routing rules and the first impact; and
   presenting the proposed changes to the carrier.

2. The method of claim 1, wherein the performance data comprises at least two of answer-to-seize ratios, traffic volumes, network usage, network capacity, exchange rates, interconnect costs, service quality, and volume agreements.

3. The method of claim 1, wherein the performance data is gathered in real-time.

4. The method of claim 1, wherein the cost and routing rules comprise at least one of business rules, benchmarks, answer-to-seize ratio thresholds, margin thresholds, percentage routing, and number of routes.

5. The method of claim 1, wherein the superseding routing rules comprise one of exclusion rules, manual exceptions, effective dates, and emergency overrides.

6. The method of claim 1, wherein automatically calculating the proposed changes in the network traffic comprises:
   identifying trunks capable of carrying outbound traffic;
   applying the cost and routing rules to the trunks to yield cost data and traffic data;
   filtering the trunks based on the cost data and the traffic data, thereby yielding remaining trunks;
   ranking the remaining trunks based on the cost data; and
   adjusting the ranking based on the superseding routing rules,
   wherein the proposed changes are based on the adjusted ranking.

7. A method for managing interconnect traffic comprising:
   identifying trunks capable of carrying outbound traffic;
   applying optimization criteria to the trunks to yield cost data and traffic data;
   filtering the trunks based on the cost data and the traffic data, thereby yielding remaining trunks;
   ranking the remaining trunks based on the cost data;
   adjusting the ranking based on override ranking instructions provided by a user; and
   returning a route guide to the user, wherein the route guide is based on the adjusted ranking.

8. The method of claim 7, wherein the traffic data comprises one of answer-to-seize ratios and trunk capacities.

9. The method of claim 7, wherein the cost data comprises one of inter-machine trunk rates and trunk margins.

10. The method of claim 7, wherein filtering comprises removing trunks that fail to meet predetermined thresholds of one of the cost data and the traffic data.

11. The method of claim 10, wherein the cost data is trunk margins, and wherein trunks that fail to meet predetermined thresholds have a trunk margin lower than a designated margin benchmark.

12. The method of claim 10, wherein the cost data is inter-machine trunk rates, and wherein trunks that fail to meet predetermined thresholds have inter-machine trunk routes with margins lower than a designated margin benchmark.

13. The method of claim 10, wherein the traffic data is answer-to-seize ratios, and wherein trunks that fail to meet predetermined thresholds have an answer-to-seize ratio lower than a designated answer-to-seize ratio benchmark.

14. The method of claim 10, wherein the traffic data is trunk capacities, and wherein trunks that fail to meet predetermined thresholds have a trunk capacity lower than a designated trunk capacity benchmark.

15. The method of claim 7, wherein the route guide presents the remaining trunks in order of preference.

16. The method of claim 7, wherein identifying capable trunks comprises excluding trunks that loop the traffic.

17. The method of claim 7, wherein if there are not enough remaining trunks to choose a routing option, the method further comprises reconsidering previously removed trunks.

18. The method of claim 7, wherein if the number of remaining trunks exceeds a designated maximum number of routes allowed, then the method further comprises removing a lowest ranked trunk until the number of remaining trunks no longer exceeds the designated number of routes allowed.

19. A method for managing interconnect traffic comprising:
   identifying trunks capable of carrying outbound traffic;
   receiving override instructions from a network operator;
   eliminating trunks identified to be excluded in the override instructions;
   eliminating trunks that could cause looping;
   removing inter-machine trunk rates;
   eliminating trunks having no rates;
   filtering the trunks based on margin, answer-to-seize ratio, and capacity, thereby leaving remaining trunks;
   ranking the remaining trunks based on cost;

adjusting the ranking of the remaining trunks based on the override instructions;
determining inter-machine trunk costs for the remaining trunks;
filtering the remaining trunks based on margin, thereby leaving final trunks;
ranking the final trunks based on cost;
adjusting the ranking of the final trunks based on the override instructions;
eliminating, from the final trunks, trunks that could cause looping, thereby leaving final available trunks;
ranking the final available trunks based on cost;
adjusting the ranking of the final available trunks based on the override instructions; and
reporting the adjusted ranking of the final available trunks to the network operator.

20. The method of claim 19, wherein, if the final available trunks are fewer than a minimum number of routes needed to choose a routing option, then the method further comprises bringing previously filtered trunks back into consideration.

21. The method of claim 19, wherein if the number of final available trunks exceeds a designated maximum number of routes allowed, then the method further comprises removing a lowest ranked trunk until the number of final available trunks no longer exceeds the designated number of routes allowed.

22. A system for managing interconnect traffic across a telecommunications network comprising:
a controller that automatically manages collection and processing of call detail records from mediation devices, wherein the call detail records are associated with the interconnect traffic;
a call detail record database that stores the call detail records;
a vendor agreement database from which the controller retrieves data for calculating least cost route guides for each quality of service level that a vendor provides;
a customer agreement database from which the controller retrieves data for calculating routing options for a customer;
a reference data database from which the controller retrieves calculation parameters;
wherein, based on the data from the vendor agreement database, the customer agreement database, and the reference data database, for a current routing scheme, the controller determines optimum network routing selections.

23. The system of claim 22, wherein the controller is adapted to receive the call detail records in a raw format.

24. The system of claim 22, wherein the vendor agreement database contains physical interconnect details, buy rates by destination, and rate plans.

25. The system of claim 22, wherein the customer agreement database contains interconnect details, sell rates by destination, and rate plans.

26. The system of claim 22, wherein the reference data database contains quality of service thresholds, answer-to-seize ratio benchmarks, and numbering plans.

27. The system of claim 22, wherein the controller rates the call detail records.

28. The system of claim 22, wherein the controller produces route guide reports, cost reports, answer-to-seize ratio reports, revenue reports, and capacity reports.

29. The system of claim 22, wherein the controller provides alerts to a user based on rules provided the user as applied to the call detail records.

30. The system of claim 22, wherein the controller is adapted to:
identify trunks capable of carrying outbound traffic,
apply optimization criteria to the trunks to yield cost data and traffic data,
filter the trunks based on the cost data and the traffic data, thereby yielding remaining trunks,
rank the remaining trunks based on the cost data,
adjust the ranking based on override ranking instructions provided by a user, and
return the optimum network routing selections to the user, wherein the optimum network routing selections are based on the adjusted ranking.

31. A system for managing a carrier's interconnect traffic across a telecommunications network comprising:
means for receiving cost and routing rules from the carrier;
means for gathering performance data corresponding to the interconnect traffic;
applying the cost and routing rules to the performance data to determine a first impact on the interconnect traffic;
means for receiving superseding routing rules from the carrier;
means for automatically calculating proposed changes in network routing based on the superseding routing rules and the first impact; and
means for presenting the proposed changes to the carrier.

* * * * *